US009721089B2

(12) United States Patent
Krishnan et al.

(10) Patent No.: US 9,721,089 B2
(45) Date of Patent: Aug. 1, 2017

(54) METHODS, SYSTEMS, AND COMPUTER READABLE MEDIA FOR EFFICIENT COMPUTER FORENSIC ANALYSIS AND DATA ACCESS CONTROL

(75) Inventors: Srinivas Krishnan, Carrboro, NC (US); Fabian Monrose, Chapel Hill, NC (US); Kevin Snow, Cary, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 502 days.

(21) Appl. No.: 14/115,094

(22) PCT Filed: May 7, 2012

(86) PCT No.: PCT/US2012/036753
§ 371 (c)(1),
(2), (4) Date: Feb. 11, 2014

(87) PCT Pub. No.: WO2012/154658
PCT Pub. Date: Nov. 15, 2012

(65) Prior Publication Data
US 2014/0157407 A1 Jun. 5, 2014

Related U.S. Application Data

(60) Provisional application No. 61/483,612, filed on May 6, 2011.

(51) Int. Cl.
*G06F 21/50* (2013.01)
*G06F 21/53* (2013.01)

(52) U.S. Cl.
CPC .............. *G06F 21/50* (2013.01); *G06F 21/53* (2013.01)

(58) Field of Classification Search
CPC ................................ G06F 21/53; G06F 21/50
(Continued)

(56) References Cited

U.S. PATENT DOCUMENTS 6,445,704 B1 * 9/2002 Howes ................ H01R 31/005
370/392
7,702,843 B1 4/2010 Chen et al.
(Continued)

OTHER PUBLICATIONS

Notification of Transmittal of the International Search Report and the Written Opinion of the International Searching Authority, or the Declaration for International Application No. PCT/US2012/036753 (Nov. 28, 2012).
(Continued)

*Primary Examiner* — Matthew Henning
(74) *Attorney, Agent, or Firm* — Jenkins, Wilson, Taylor & Hunt, P.A.

(57) ABSTRACT

According to one aspect, the subject matter described herein includes a method for efficient computer forensic analysis and data access control. The method includes steps occurring from within a virtualization layer separate from a guest operating system. The steps include monitoring disk accesses by the guest operating system to a region of interest on a disk from which data is copied into memory. The steps also include tracking subsequent accesses to the memory resident data where the memory resident data is copied from its initial location to other memory locations or over a network. The steps further include linking operations made by the guest operating system associated with the disk accesses with operations made by the guest operating system associated with the memory accessed.

19 Claims, 10 Drawing Sheets

(58) Field of Classification Search
USPC .......................................................... 726/22
See application file for complete search history.

(56) References Cited

U.S. PATENT DOCUMENTS

| | | | | |
|---|---|---|---|---|
| 2003/0191982 | A1* | 10/2003 | Arakawa | G11B 20/1883 714/6.13 |
| 2004/0230794 | A1* | 11/2004 | England | G06F 9/45537 713/164 |
| 2006/0004944 | A1 | 1/2006 | Vij et al. | |
| 2006/0143350 | A1* | 6/2006 | Miloushev | G06F 9/5016 710/242 |
| 2007/0094312 | A1* | 4/2007 | Sim-Tang | G06F 17/30085 |
| 2009/0320009 | A1 | 12/2009 | Chow et al. | |
| 2009/0327576 | A1 | 12/2009 | Oshins | |
| 2010/0057881 | A1* | 3/2010 | Corry | G06F 3/0604 709/216 |
| 2010/0241654 | A1* | 9/2010 | Wu | G06F 17/30233 707/769 |
| 2011/0099335 | A1* | 4/2011 | Scott | G06F 12/0842 711/141 |
| 2011/0246767 | A1* | 10/2011 | Chaturvedi | G06F 21/53 713/164 |
| 2012/0047313 | A1* | 2/2012 | Sinha | G06F 12/08 711/6 |
| 2013/0091568 | A1* | 4/2013 | Sharif | G06F 21/50 726/22 |

OTHER PUBLICATIONS

Barham, et al., "Xen and the Art of Virtualization," Proceedings of the 19th ACM Symposium on Operating Systems Principles, pp. 164-177 (2003).
Buchholz, et al., "On the Role of File System Metadata in Digital Forensics." Digital Investigation 1, 4 pp. 1-15 (2004).
Chen, et al., "Towards an Understanding of Anti-virtualization and Anti-debugging Behavior in Modern Malware," Dependable Systems and Networks pp. 1-10 (Rine 2008).
Chen, et al., "When Virtual is Better than Real," Proceedings of the Workshop on Hot Topics in Operating Systems pp. 133-138 (May 2001).
Denning, et al., "Certification of Programs for Secure Information Flow," Communications of the ACM, vol. 20, No. 7, pp. 504-513 (1977).
Dinaburg, et al., "Ether: Malware Analysis via Hardware Virtualization Extensions," Proceedings of the 15th ACM Conference on Computer and Communications Security pp. 51-62 (2008).
Franklin, et al., "An inquiry into the Nature and Causes of the Wealth of Internet Miscreants," Proceedings of the 14th ACM conference on Computer and Communications Security pp. 375-388 (2007).
Garfinkel, et al., "A Virtual Machine Introspection Based Architecture for Intrusion Detection," Network and Distributed Systems Security Symposium pp. 191-206 (2003).
Garfinkel, et al., "Compatibility is not Transparency: VMM Detection Myths and Realities," Proceedings of the 11th USENIX workshop on Hot Topics in Operating Systems pp. 1-6 (2007).
Garfinkel, et al., "Terra: A Virtual Machine-Based Platform for Trusted Computing," Proceedings of ACM Symposium on Operating System Principles pp. 193-206 (2003).
Jain, et al "Application-Level isolation and Recovery with Solitude," Proceedings of EuroSys pp. 95-107 (Apr. 2008).
Jiang et al., "Stealthy Malware Detection through VMM-based "out-of-the-box" Semantic View Reconstruction," Proceedings of the 14th ACM conference on Computer and Communications Security pp. 128-138 (2007).
Krishnan et al., "Trail of Bytes: Efficient Support for Forensic Analysis," CCS'10, pp. 1-11 (Oct. 4-8, 2010).
Leung et al., "Measurement and Analysis of Large-scale Network File System Workloads," USENIX Annual Technical Conference pp. 213-226 (2008).
Litty, et al., "Hypervisor Support for identifying Covertly Executing Binaries," Proceedings of USENIX Security Symposium pp. 243-257 (Aug. 2008).
Muniswamy-Reddy, et al., "Provenance-aware Storage Systems," Proceedings of the 2006 USENIX Annual Technical Conference pp. 43-56 (2006).
Payne, et al., "Secure and Flexible Monitoring of Virtual Machines," Annual Computer Security Applications Conference pp. 385-397 (2007).
Quinlan, et al., "Venti: A New Approach to Archival Data Storage," Proceedings of the USENIX Conference on File and Storage Technologies pp. 89-101 (2002).
Shneiderman, "Response Time and Display Rate in Human Performance with Computers," ACM Computing Surveys, vol. 16, No. 3, pp. 265-285 (1984).
Vincenzetti, et al., "ATP—Anti Tampering Program," Proceedings of USENIX Security pp. 79-90 (1993).
Chen, et al., "Defeating Memory Corruption Attacks via Pointer Taintedness Detection," IEEE International Conference on Dependable Systems and Networks DSN pp. 1-11 (2005).
Farmer et al., Forensic Discovery, Addison-Wesley, http://www.porcupine.org/forensics/forensic-discovery/, pp. 1-150 (2006).
F-Secure. MBR Rootkit, "A New Breed of Malware". See http://www.f-secure.com/weblog/archives/00001393.htm, pp. 1-2 (2008).
Goel, et al., "The Taser Intrusion Recovery System," Proceedings of Symposium on Operating Systems Principles, pp. 1-30 (Oct. 2005).
Goldberg, "Survey of Virtual Machine Research," IEEE Computer Magazine, vol. 7, No. 6, pp. 34-45 (1974).
Jay, et al., "Modeling the Effects of Delayed Haptic and Visual Feedback in a Collaborative Virtual Environment," ACM Transactions on Computer-Human Interaction, vol. 14, No. 2, pp. 1-33 (2007).
Jones, et al., "Antfarm: Tracking Processes in a Virtual Machine Environment," Proceedings of the USENIX Annual Technical Conference, pp. 1-14 (2006).
Jones, et al., "Geiger: Monitoring the Buffer Cache in a Virtual Machine Environment," SIGPLAN Not., vol. 41, No. 11, pp. 13-23 (2006).
Kim, et al., "The Design and Implementation of Tripwire: a File System Integrity Checker," Proceedings of the 2'd ACM Conference on Computer and Communications Security, pp. 18-29 (1994).
King, et al., "Backtracking Intrusions," Proceedings of the 19th ACM Symposium, on Operating Systems Principles, pp. 1-14 (Dec. 2003).
King, et al., "Enriching Intrusion Alerts Through Multi-host Causality," Proceedings of Network and Distributed System Security Symposium, pp. 1-12 (2005).
Krishnan, et al., "Time Capsule: Secure Recording of Accesses to a Protected Datastore," Proceedings of the 2'd ACM Workshop on Virtual Machine Security, pp. 23-31 (Nov. 2009).
Leung, et al., "Intel Virtualization Technology: Hardware Support for Efficient Processor Virtualization," Intel Technology Journal vol. 10, Issue 03, pp. 167-178 (2006).
Muniswamy-Reddy, et al., "Provenance for the Cloud," Harvard School of Engineering and Applied Sciences, pp. 1-14 (2010).
Peisert et al., "Computer Forensics in Forensis," ACM Operating System Review vol. 42, pp. 112-122 (2008).
Provos, et al., "The Ghost in the Browser: Analysis of Web-based Malware," First Workshop on Hot Topics in Understanding Botnets, pp. 1-9 (2006).
Slowinska, et al., "Pointless Tainting? Evaluating the Practicality of Pointer Tainting," Proceedings of EuroSys, pp. 1-14 (Apr. 2009).
White, "Cyber-Infrastructure Uses for the NIST NSRL (National Software Reference Library," NIST-United States Department of Commerce, National Institute of Standards and Technology, slides 1-14 (2009).

* cited by examiner

METHODS, SYSTEMS, AND COMPUTER READABLE MEDIA FOR EFFICIENT COMPUTER FORENSIC ANALYSIS AND DATA ACCESS CONTROL

PRIORITY CLAIM

This application claims the benefit of U.S. Provisional Patent Application Ser. No. 61/483,612, filed May 6, 2011; the disclosure of which is incorporated herein by reference in its entirety.

GOVERNMENT INTEREST

This invention was made with government support under awards CNS-0915364 and CNS-0852649 awarded by the National Science Foundation. The government has certain rights in the invention.

TECHNICAL FIELD

The subject matter described herein relates to efficient computer forensic analysis and data access control. More specifically, the subject matter relates to methods, systems, and computer readable media for efficient computer forensic analysis and data access control.

BACKGROUND

As computer systems continue to pervade modern life, computer forensics is assuming an ever more prominent role in various industries. Computer forensics techniques are utilized not only by government and private entities seeking to recover data or reconstruct events, but also by professionals within the computer industry attempting to determine how a specific vulnerability was exploited or to detect a potential data leak. The ability to accurately reconstruct an event that has occurred within a computing system is often a function of the quantity, detail, and integrity of the information recorded leading up to the event.

Computer virtualization or hardware virtualization is the full or partial simulation of a computer or computing platform ("virtual" or "guest" machine) by an actual computer or computing platform ("host" machine). The software or firmware on the "host" machine that manages the "virtual" machine is commonly referred to as a "hypervisor." Virtualization is often associated with both hardware and administrative efficiency and is being increasingly employed for a wide range of applications.

Accordingly, a need exists for methods, systems, and computer readable media for efficient computer forensic analysis and data access control.

SUMMARY

According to one aspect, the subject matter described herein includes a method for efficient computer forensic analysis and data access control. The method includes steps occurring from within a virtualization layer separate from a guest operating system. The steps include monitoring disk accesses by the guest operating system to a region of interest on a disk from which data is copied into memory. The steps also include tracking subsequent accesses to the memory resident data where the memory resident data is copied from its initial location to other memory locations or over a network. The steps further include linking operations made by the guest operating system associated with the disk accesses with operations made by the guest operating system associated with the memory accesses.

According to another aspect, the subject matter described herein includes a system for efficient computer forensic analysis and data access control. The system includes a virtualization layer separate from a guest operating system for virtualizing resources of an underlying computing system. The system also includes a storage monitoring module located within the virtualization layer and for monitoring disk accesses by the guest operating system to a region of interest on a disk from which data is copied into memory. The system further includes a memory monitoring module located within the virtualization layer for tracking subsequent accesses to the memory resident data where the memory resident data is coped from its initial location to other memory locations or over a network. The system further includes a system call monitoring module for linking operations made by the guest operating system associated with the disk accesses with operations made by the guest operating system associated with the memory accesses.

As used herein, the term "module" refers to software in combination with hardware (such as a processor) and/or firmware for implementing features described herein.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
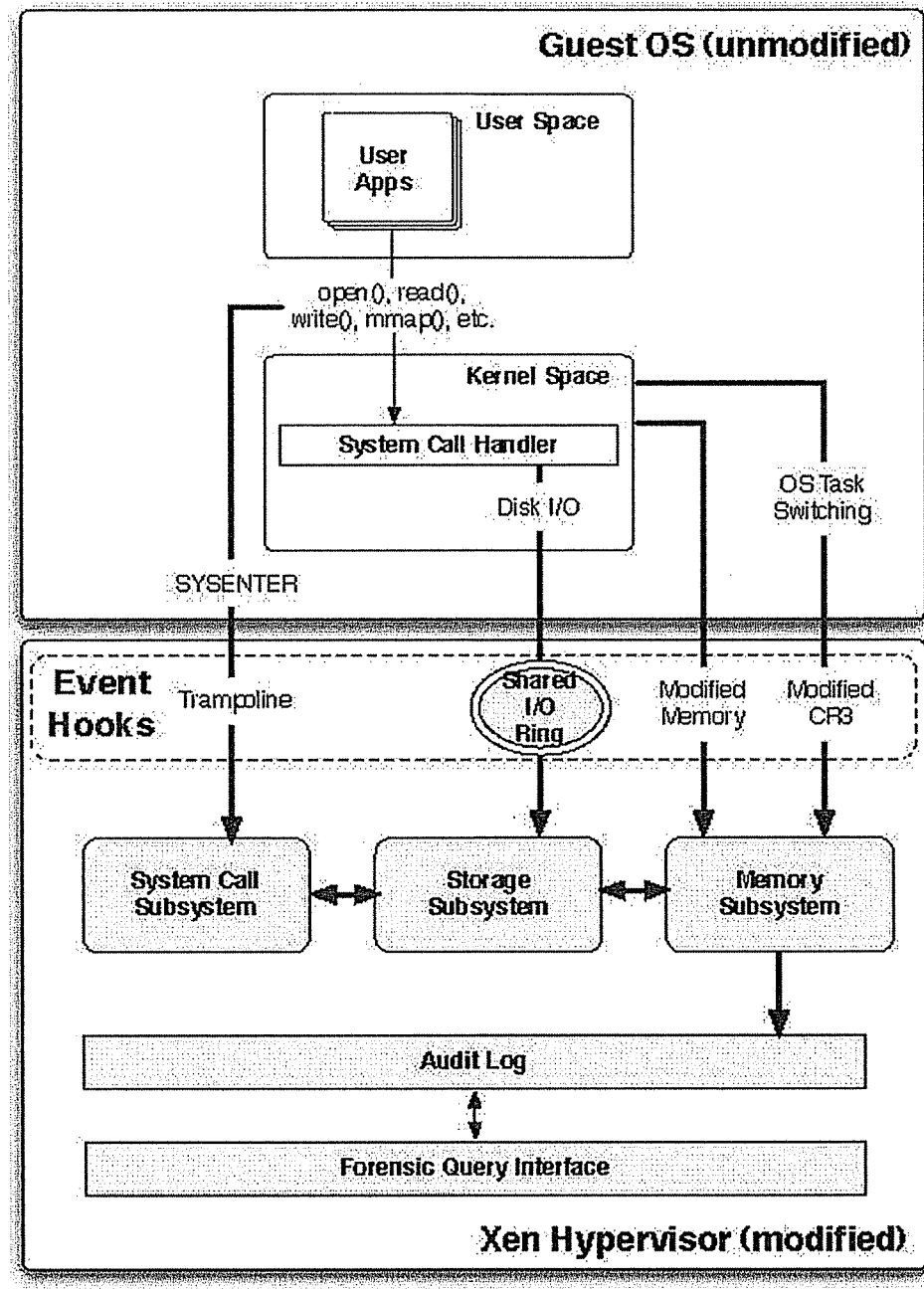
FIG. 1 illustrates an exemplary architecture for efficient computer forensic analysis and data access control in accordance with embodiments of the subject matter described herein.

Methods, systems, and computer readable media for efficient computer forensic analysis and data access control are provided.

Forensic analysis of computer systems may require that one first identify suspicious objects or events, and then examine them in enough detail to form a hypothesis as to their cause and effect. While the ability to gather vast amounts of data has improved significantly over the past two decades, it is all too often the case that detailed information is lacking just when it is needed most. As will be described in greater detail below, the subject matter described herein provides a forensic platform that transparently monitors and records data access events within a virtualized environment using only the abstractions exposed by the hypervisor. The approach monitors accesses to objects on disk and follows the causal chain of these accesses across processes, even after the objects are copied into memory. The forensic layer records these transactions in a tamper evident version-based audit log that allows for faithful, and efficient, reconstruction of the recorded events and the changes they induced. To demonstrate the utility of the approach, an extensive empirical evaluation is provided, including a real-world case study demonstrating how the platform can be used to reconstruct valuable information about the what, when, and how, after a compromise has been detected. Further, a tracking mechanism that can monitor data exfiltration attempts across multiple disks and block attempts to copy data over the network is provided.

Postmortem intrusion analysis is an all too familiar problem. Computing devices are repeatedly compromised while performing seemingly benign activities like browsing the Web [1], interacting on social-networking websites, or by malicious actors that use botnets as platforms for various nefarious activities [2]. Sometimes, threats can also arise from the inside (e.g., corporate espionage), and often lead to substantial financial losses. Underscoring each of these security breaches is the need to reconstruct past events to know what happened and to better understand how a particular compromise may have occurred. Although there has been significant improvements in computer systems over the last few decades, data forensics remains a very tedious process; partly because the detailed information required to reliably reconstruct events is simply not there when it is needed most [3].

Recent efforts in data forensic research have focused on tracking changes to file system objects by using monitoring code resident in kernel space, or by making changes to the application binary interface. Without proper isolation, however, these approaches are subject to tampering and may therefore not provide strong guarantees with respect to the integrity of recorded events. Malicious users can, for instance, inject code into either kernel or user space, thereby undermining the integrity of logs maintained by the tracking mechanism. Virtualization [4] provides a potential avenue for enabling the prerequisite isolation criteria by providing a sandbox for operating system code and applications. For example, a hypervisor can mediate disk accesses at the block level by presenting a virtual disk to the virtual machine (VM). One disadvantage, however, is that this abstraction suffers from a "semantic gap" problem [5], in which the mapping between file-system objects and disk blocks are lost, thereby making it difficult to track objects beyond the disk layer.

The subject matter described herein proposes an approach for monitoring accesses to data in a virtualized environment while bridging the semantic gap issue. Specifically, an approach for monitoring accesses to data that originated from disk is provided. The approach may capture subsequent accesses to that data in memory—even across different processes. The approach may achieve this goal without any monitoring code resident in the virtual machine, and may operate purely on the abstractions provided by the hypervisor. Operating at this layer may require access to the disk at the block layer, memory at the physical frame layer and system calls at the instruction layer—all of which offer substantial engineering challenges of their own. In that regard, one aspect of the subject matter described herein includes the design and implementation of an accurate monitoring and reconstruction mechanism that collates and stores events collected at different levels of abstraction. The subject matter described herein also includes a query interface for mining the captured information, and in doing so, may provide forensic analysts with far more detailed information to aide in understanding what transpired after a compromise (be it a suspicious transfer of data or modification of files) has been detected. The subject matter described herein further includes an extensive empirical analysis of the platform, including a real world case study.

Generally speaking, computer forensics attempts to answer the question of who, what and how after a security breach has occurred [6]. The fidelity of the recorded information used in such analyses is highly dependent on how the data was collected in the first place. Keeping this in mind, the approaches explored in the literature to date can be broadly classified as either client-based approaches (that use application or kernel based logging) or virtualization-based approaches (that use hypervisor based logging). While client-based approaches can provide semantic-rich information to a security analyst, their fidelity can be easily undermined as the logging framework is usually resident within the same system that its monitoring. Hypervisor-based approaches, on the other hand, are generally thought to lack the semantic detail of client-based approaches, but can achieve greater resistance to tampering, as the logging mechanisms reside in privileged sandboxes.

Client-based Approaches: File-system integrity and verification has a long history, with some early notable examples being the work of Spafford et al. on Tripwire [7] and Vincenzetti et al. on ATP [8]; both of which use integrity checks to verify system binaries (e.g., /sbin/login). Extending this idea further, Taser [9] detects unauthorized changes to the filesystem and reverts to a known good state once malfeasance is detected. Solitude [10]extends this concept even further by using a copy-on-write solution to selectively rollback files, thereby limiting the amount of user data that would be lost by completely reverting to the last known good state. These systems do not record evidence on how an attack occurred or the data that was compromised. Instead they are geared primarily at efficient restoration back to a known good state. Systems such as PASS [11] and derivatives thereof (e.g., [12]) provide data provenance by maintaining meta-data in the guest via modifications to the file-system. These approaches, however, require extensive guest modifications and share the same problems of client-based systems.

Virtualization-Based Approaches: In order for virtualization-based approaches to work in a data forensic framework, they need to first overcome the disconnect in semantic views at different layers in an operating system [5, 13]. In particular, Chen et al. [5] provides excellent insight into advantages and disadvantages of implementing secure systems at the hypervisor layer. The challenges are generally related to performance and the difference in abstractions between the hypervisor layer and the guest virtual machine. While the issue of performance has been addressed as hypervisor technologies mature, the "semantic gap" still remains. Anffarm [14], Geiger [15] and VMWatcher [16] have bridged this gap for a given layer of abstraction, but no single work has tackled the problem of bridging the gap for a set of interconnected layers of abstraction (i.e., spanning disk, memory, and processes) while preserving the causal chain of data movement.

King et al. [17] provides an event reconstruction approach for relating processes and files. BackTracker reconstructs events over time by using a modified Linux kernel to log system calls and relate those calls based on OS-level objects [18]. The semantic gap issue is bridged by parsing the memory contents of the virtual machine during introspection time using an event logger compiled with the virtual machine's kernel headers. This approach is fragile, as any changes to the guest kernel may undermine the approach [18] [17]. Similarly, using the VMbased approach, it is not possible to monitor operating systems that are closed-source. While BackTracker made significant strides in this area, we find that relying solely on system calls to glean OS state has several drawbacks. For one, since it does not monitor memory events, data movements (such as a process sending a file over a network socket) can only be inferred as "potential" causal relationships; neither can it detect the exact object that was sent over the network. To be fair, these were not part of its stated goals. By contrast, the causal relationships we build attempt to capture access chains across processes, all-the-while storing the exact content that was accessed and/or modified.

Patagonix [19] and XenAccess [20] employ forms of memory inspection. Patagonix's goal is to detect changes between binaries on disk and their image in memory. XenAccess is positioned as an extensible platform for VM monitoring. The subject matter described herein differs in that it employs signals from different layers of the VM (i.e., the system-call, memory, and storage layers) to correlate accesses to a monitored object. Further the subject matter described herein significantly extends earlier work [21] to include new techniques for dynamic provisioning and selective blocking.

In accordance with embodiments of the subject matter described herein, fast and efficient recording of events involving monitored data (e.g., a set of files on disk) is possible, and at a granularity that allows a security analyst to quickly reconstruct detailed information about accesses to objects at that location. Conceptually, the approach is composed of two parts, namely an efficient monitoring and logging framework, and a rich query system for supporting operations on the recorded data. Events are monitored to a collection of locations L (i.e., memory, disk, or network) and read or write operations on L are recorded. These operations are denoted as O. Any additional operations (e.g., create or delete) can be modeled as a combination of these base operations. These accesses may be tied to the corresponding causal entity that made them to ensure that a forensic analyst has meaningful semantic information for exploration [22].

One approach for capturing these causal relationships is based on an event-based model, where events are defined as accesses, O, on a location L caused by some entity, i.e., $E_i(O,L) \rightarrow ID$. Loosely speaking, an entity is modeled as the set of code pages resident in a process' address space during an event. The distinct set of code pages belonging to that process is then mapped to a unique identifier. This event-based model also allows for automatically recording events that are causally related to each other, and to chain the sequences of events as $U_i^n E_i$. Intuitively, events are causally related based on the same data being accessed from multiple locations; i.e., $E_0(O,L)$ may be considered to be causally related to $E_1(O',L')$ if the same data object resides in L and L'. The event model also facilitates the implementation of protection mechanisms based on realtime tracking of causally related events. One such example of data protection described herein is the blocking of exfiltration attempts over the network.

Since the hypervisor views the internals of a VM as a black box, a key challenge is in realizing this model with minimal loss of semantic information. This challenge stems from the fact that the monitoring subsystem gets disjoint views of operational semantics at different levels of abstraction. For example, a read system call operates with parameters in virtual memory and the guest file system layer, which then spawns kernel threads that translate the file system parameters into blocks, after which the request is finally placed on the I/O queue. Without any code in the guest, the challenge is in translating these requests and chaining them together. As will be described in greater detail below, one aspect of the subject matter described herein includes its ability to link together the various events captured within the hypervisor.

In some embodiments, the monitoring framework may take advantage of a hypervisor supporting hardware virtualization. For example, the monitoring framework may be built on top of Xen [23] [24]. At a high level, the Xen hypervisor is composed of a privileged domain and a virtual machine monitor (VMM). The privileged domain is used to provide device support to the unprivileged guests via emulated devices. The VMM, on the other hand, manages the physical CPU and memory while providing the guest with a virtualized view of system resources. This allows the framework to monitor—from the hypervisor—specific events that occur in the virtual machine.

FIG. 1 illustrates an exemplary architecture for efficient computer forensic analysis and data access control in accordance with embodiments of the subject matter described herein. Referring to FIG. 1, the framework is composed of three modules that monitor storage, memory, and system calls. The modules are fully contained within the hypervisor with no code resident in the virtual machine. The system is initiated by monitoring accesses to a specific set of virtual machine disk blocks. The storage module monitors all direct accesses to these blocks and their corresponding objects, while subsequent accesses to these objects are tracked via the memory and system call modules. Specifically, the memory module in conjunction with the system call module allows the framework to monitor accesses to the object after it has been paged-into memory, and also builds causal relationships between accesses. The memory module is also responsible for implementing the mapping function that ties events to specific processes.

As a result of the design, each of these modules have to bridge the "semantic gap" prevalent at that layer of abstraction; i.e., blocks to files, machine physical addresses to guest virtual addresses, and instructions to system calls. Since the framework is built to log events happening in the guest, a single guest event might trigger multiple hypervisor events crossing various abstraction boundaries, e.g., consecutive writes to a file by a text editor will require disk objects to be mapped back to the file, writes to the page in the guest's memory have to be mapped to the actual page in physical memory, etc. To effectively observe these linkages, the modules work in tandem using a novel set of heuristics to link events together. These events are stored in a version-based audit log, which contains time stamped sequences of reads and writes, along with the corresponding code pages that induced these changes. The log integrity is ensured using forward integrity hash chaining. The functionality of each of these monitoring modules will be discussed in greater detail below.

The storage module is the initialization point for the entire monitoring framework. That is, virtual machine disk blocks are monitored via a watchlist maintained by this module. Any accesses to blocks on the watchlist triggers an update to the storage module. Accessing a block on the watchlist also notifies the memory module to monitor the physical page where the block is paged-in. The following discussion will describe how access at the block layer is monitored.

Figure 2:
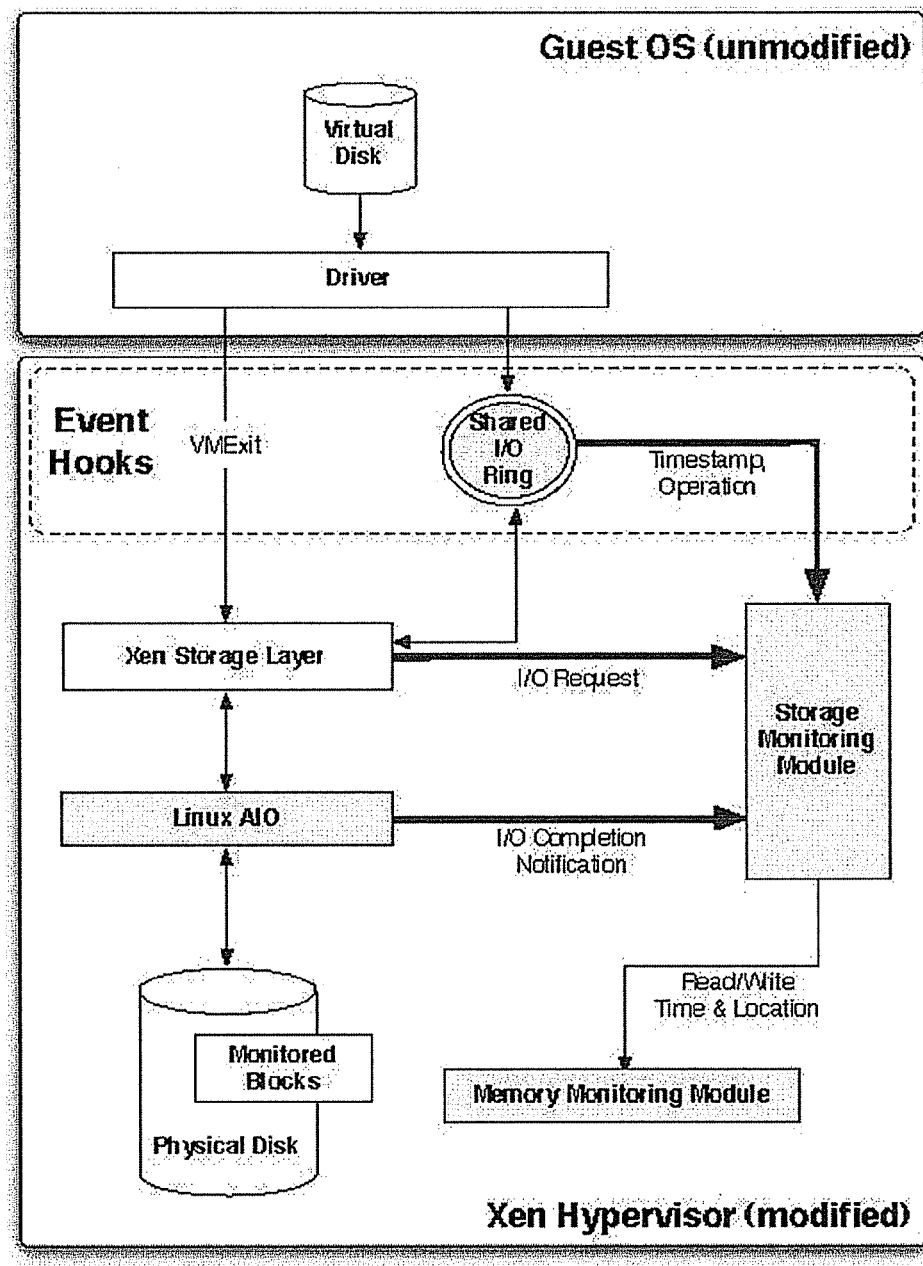
FIG. 2 illustrates an exemplary storage monitoring module for efficient computer forensic analysis and data access control in accordance with embodiments of the subject matter described herein.

FIG. 2 illustrates an exemplary storage monitoring module for efficient computer forensic analysis and data access control in accordance with embodiments of the subject matter described herein. Referring to FIG. 2, the storage monitoring module may include the Xen storage model, enhanced to monitor disk I/O. In Xen, block devices are supported via the Virtual Block Device layer. Guests running on top of Xen see a virtual disk and therefore cannot directly modify physical disk blocks. Specifically, all accesses are mediated through the Xen storage layer, which exposes an emulated virtual disk. All I/O requests from the guest are written to an I/O ring, and are consumed by the storage layer.

The storage module monitors physical blocks on this virtual disk and automatically adds them to a watchlist it maintains. As guests place their I/O requests onto the shared ring, monitoring code is notified via a callback mechanism of any accesses to blocks on the watchlist. This enables a request to be time stamped as soon as it hits the I/O ring—which is critical in matching the disk access with the system call that made the request, enabling the memory module to link a disk access with a specific process. Finally, the storage module waits for all reads/writes to be completed from disk before committing an entry in our logging datastructure.

The aforementioned approach involving disk-level monitoring is not ideal, as tracking copies to unmonitored disks (the system disk, for example) would lead to tracking the entire destination disk as well. Since access to any block on a monitored disk triggers the storage module, each additional disk that requires monitoring could substantially increase the number of notifications that the storage module needs to process. Furthermore, it is usually the case that a given disk only has a limited set of files that require monitoring, whereas the disk level granularity does not allow us to exclude any given set of files on disk from being monitored. Therefore, in order to improve performance and precision, the disk-level approach in [21] may be extended to explicitly disabled tracking accesses across unmonitored disks.

Instead, a new mechanism for tracking events is introduced system-wide, called dynamic provisioning. Rather than monitoring an entire virtual disk, the system is instead initialized with a set of file hashes that require monitoring. The blocks corresponding to the file hashes are added to the watchlist, and accesses to them trigger the storage module. As derivations of the monitored data are created by user operations across different disks the corresponding blocks are dynamically provisioned onto the watchlist and monitored as well. To do so efficiently, Xen's storage model may be leveraged to present a consistent block-level device by abstracting away hardware level details. Callbacks may also be implemented within Xen's storage layer to receive notifications of data accesses across all the block devices available to the VM. The relevant blocks are then identified by querying the memory and system call module, a process that is described in greater detail below.

As will be described in greater detail below, the monitoring platform uses a special data structure to log all accesses. The amount of information stored in these logs is directly related to the number of blocks monitored. By only tracking at the block level and not the entire disk, the number of blocks monitored may be substantially reduced, allowing administrators to exclude files they deem non-essential, (e.g., temporary log files). Hence the technique of monitoring blocks on access and dynamically provisioning them has an added advantage of lowering the rate of growth of the logs.

As alluded to above, accesses to disk blocks typically happen as the result of a system call. In order to tie these two events together, it is imperative that events at the system call layer also be monitored. How this is achieved will be described below.

Figure 3:
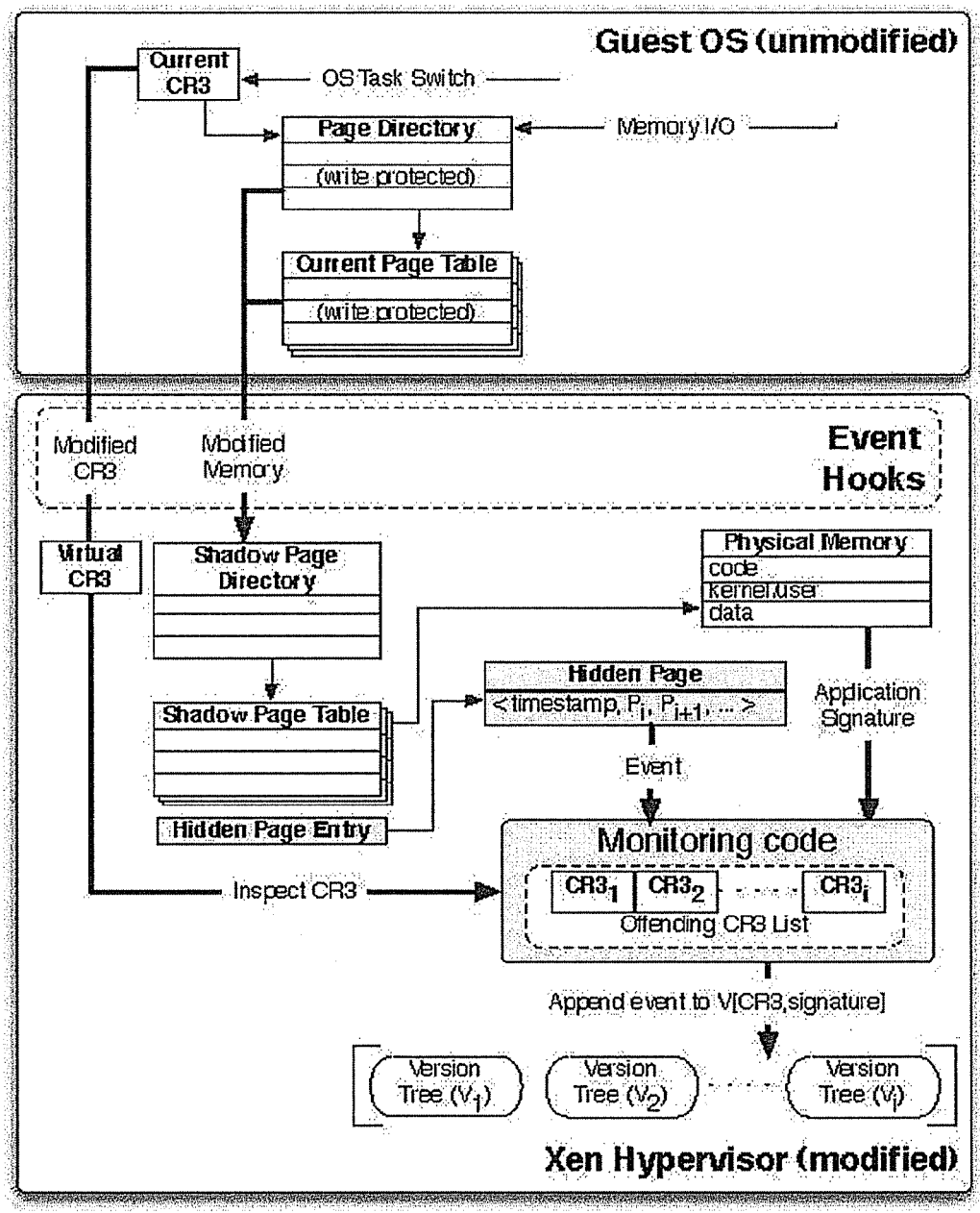
FIG. 3 illustrates an exemplary memory monitoring module for efficient computer forensic analysis and data access control in accordance with embodiments of the subject matter described herein.

FIG. 3 illustrates an exemplary memory monitoring module for efficient computer forensic analysis and data access control in accordance with embodiments of the subject matter described herein. The system call module is responsible for determining when the guest makes system calls to locations of interest (L=disk, memory or network), parsing the calls and inferring semantic linkage between related calls. The module monitors the system calls, which are then used to infer semantic linkages with the memory monitoring module.

The use of hardware virtualization makes the efficient tracking of system calls in the guest an interesting challenge. To see why, notice that system calls on the x86 platform can be made by issuing either a soft interrupt 0x80 or by using fast syscalls (i.e., SYSENTER). Modern operating systems use the latter as it is more efficient. This optimized case introduces an interesting challenge: a traditional 0x80 would force a VMEXIT (thereby allowing one to trap the call), but fast syscalls on modern hardware virtualized platforms do not induce a VMEXIT. Syscalls, however, must still retrieve the target entry point (in the VM's kernel) by examining a well-known machine specific register (MSR). (The SYSENTER call on the Intel platform uses the MSR SYSENTER_EIP to find the target instruction. This MSR is always located on Intel machines at address 176$h$.) Similar approaches for notification on system call events at the hypervisor layer have also been used recently in platforms like Ether [25].

Since the hypervisor sets up the MSR locations, it can monitor accesses to them. The solution involves modifying the hypervisor to load a trampoline function (instead of the kernel target entry) on access to the MSR for syscalls. The trampoline consists of about 8 lines of assembly code that simply reads the value in eax and checks if it is interested in monitoring that particular system call before jumping into the kernel target point. (System call numbers are pushed into eax.) If it is interested in monitoring the system call, then the memory module (Section III-A3) is triggered to check the parameters of the call to see if they are accessing objects on the memory module's watchlist. The trampoline code runs inline with virtual machine's execution and does not require a trap to the hypervisor, avoiding the costly VMEXIT.

The system call module in conjunction with the memory module is responsible for inferring the semantic linkage between a set of related operations, for example, a read( ) call on a file whose blocks are monitored and a subsequent socket open( ), write( ) of the bytes to a network socket. The syscalls types that could yield operations in the event model may be selectively monitored.

For example, syscalls that can be broadly classified as involving (1) file system objects, e.g., file open, read, write (2) memory resident objects, e.g., map operations (3) shared memory objects, e.g., ipc, pipes and (4) network objects, e.g., socket open and writes may be monitored. As described above, the system call module will monitor these calls and parse the parameters. One straightforward approach for creating linkages between such operations is to simply examine the source and destination parameters to infer data movement. In the aforementioned example, the system call monitor will be triggered on each of the file read( ), network socket open( ) and write( ) calls. Since the source parameter of the read( ) references a monitored page, the memory module notifies the system call module of the offending access, and also adds the corresponding page of the destination parameter (e.g., the buffer) to its watchlist. When the memory module is later triggered because of the write on a network socket, that access will also be returned as an "offending" access since it references a page that is now on the memory module's watchlist. As a result, the system call module will connect the two operations and infer the semantic linkage. Unlike other approaches that attempt to infer causal linkages based on data movements, our platform is able to accurately and definitively link events that are causally related. The specifics of how the memory module decides if a particular event is accessing a monitored object is described in greater detail below.

The key function of memory monitoring subsystem module is to track accesses to monitored objects once they are resident in memory. Recall that the initial access to L on disk causes the storage module to notify the memory module of potential data movement. This access causes a page fault, as the object has not yet been paged into memory. Since Xen manages the physical memory and hardware page tables, the fault is handled by the hypervisor. The memory monitoring module is notified of this fault via the callback placed in Xen's shadow page table mechanism, and updates its watchlist with the machine physical page of the newly paged-in monitored object. For brevity, the system level details are omitted and only the essential details are provided. It is noted that Xen provides the VM with a virtualized view of the physical memory by performing the actual translation from guest physical pages to actual machine physical pages [23].

The memory module uses its watchlist to track all subsequent accesses to monitored objects in memory. Recall that the system call module consults the memory module to determine if an access is to a protected object. To make this determination, the memory module consults its watchlist, and returns the result to the system call module. (Recall the memory module must translate the guest virtual address to its physical address in a machine physical page.)

It will be appreciated that the memory monitoring module is in no way restricted to tracking only events triggered via system calls. Since it monitors objects in physical memory, any direct accesses to the object will be tracked. For instance, accesses to objects in the operating systems buffer cache will always trigger a check of the memory module's watchlist.

This approach extends the coverage of events even to accesses that might occur on monitored objects that are copied over to other memory locations. Since the memory monitoring module is triggered from the initial page-in event of the monitored data block from disk into memory, this paged-in machine physical page is automatically added to the watchlist. Hence, any subsequent events on this page such as a memcpy( ) will result in the target memory location of the copy operation also being added to the watchlist (e.g., the destination machine physical page in memcpy). This is done to prevent evasion techniques that might copy the data into a buffer and then send the data over a network socket. Hence, any indirect data exfiltration attempts will also be recorded as an access to the original monitored block.

This is a key difference between the type of taint tracking [26, 27] commonly used to track objects in memory and the physical page monitoring proposed. Although taint tracking of that type affords for monitoring accesses to memory locations at a very fine granularity (e.g. pointer tracking), it does incur high overhead [28]. The memory tracking implemented here tracks accesses to the initial physical page frame where the data from monitored storage was paged in and subsequent physical memory locations the data was copied to. A low overhead is achieved via a copy-on-write mechanism that tracks subsequent changes and accesses to the monitored objects. This implementation affords a coarser mechanism compared to taint tracking for memory monitoring, but does so at a much lower cost.

Once the decision is made that an access is to a monitored object, the memory module notes this event by timestamping the access. (Specifically, a hidden page may be appended in the shadow page table of the process with the timestamp and objects accessed.) The module also stores a "signature" of the code pages of the offending process. Recall that the CR3 register on the x86 platform points to the page directory of the currently executing process within the VM. Hence, to keep overheads low, the signature creation is done lazily and the address of the CR3 register is added (page-table register) to a queue of offending addresses that must be extracted later.

The signature is created as follows. The page frames of each item in the queue are inspected to examine those codepages that are unique to the process being inspected. Because a CR3 could potentially point to different processes over time, the accesses are logged in a modified B+–tree [29] where the root node is indexed by the tuple ⟨CR3, set of codepages⟩. In this way, appending a new process' events to an old process' log is averted. This structure may be referred to as a version-tree.

Figure 4:
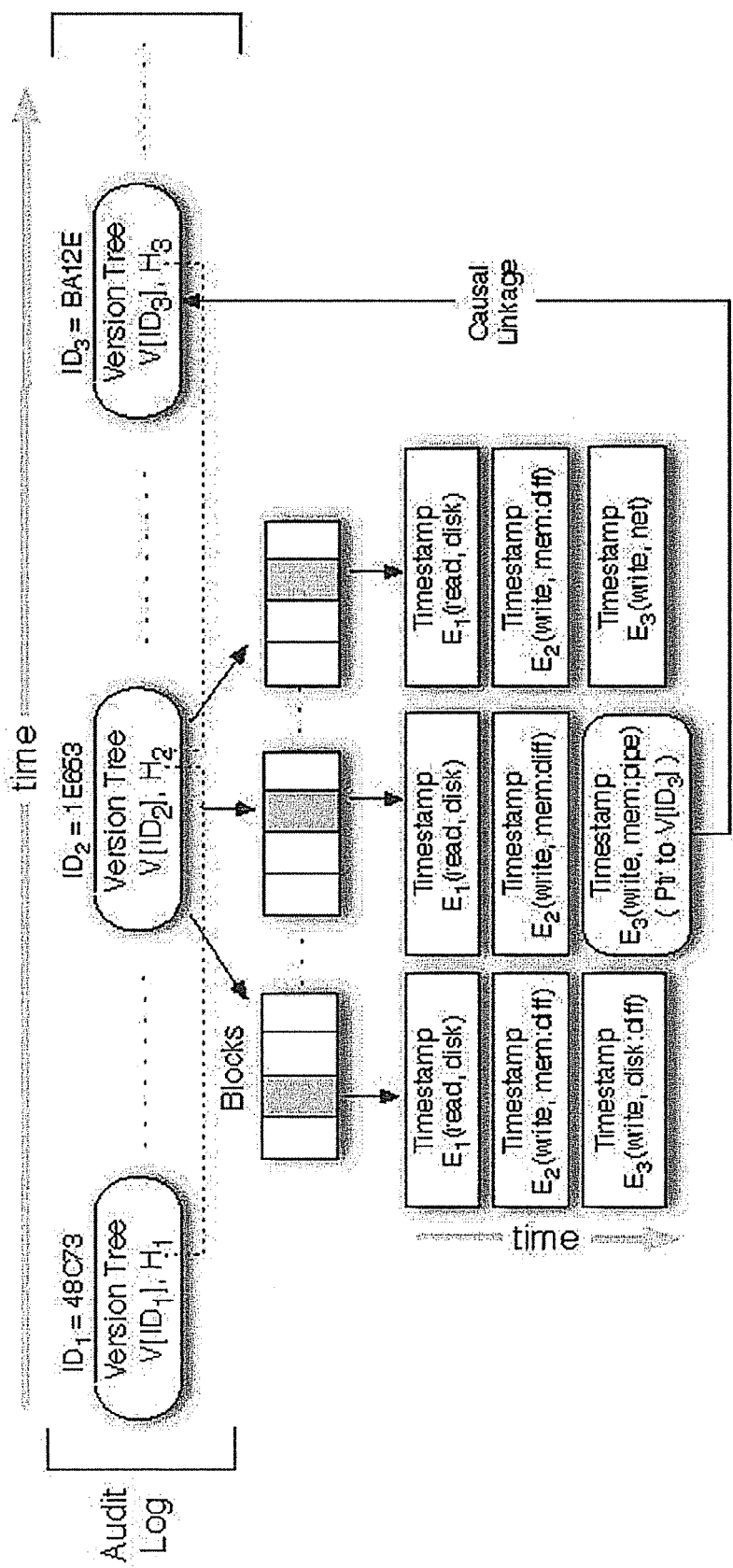
FIG. 4 illustrates an exemplary version tree for efficient computer forensic analysis and data access control in accordance with embodiments of the subject matter described herein.

FIG. 4 illustrates an exemplary version tree for efficient computer forensic analysis and data access control in accordance with embodiments of the subject matter described herein. The keys to the version-tree are the block numbers corresponding to the monitored object on disk, and the leaves are append-only entries of recorded operations on location L. The version-tree is built as follows:
1) If no version-tree exists for the process being examined (i.e., no tree has a root node that equals the current CR3 and code page hash), then let the set of known codepages be S=∅, and skip to step (3).
2) Compare the hash of the codepages in the page table to the stored value in the tree. If the hashes are the same, there are no new codepages to record, and only the accesses made by this process need to be updated; therefore, proceed to step (4).
3) To determine what new codepages have been loaded into memory, compute the cryptographic hash of the contents of the individual pages, $c_i$. Next, for each $h(c_i) \notin S$, determine whether it is a kernel or user page (e.g., based on the U/S bit), and label the page accordingly. If $h(c_i)$ is found in page tables of more than one process, then label that page as shared.
4) Let S' be the set containing the hashes of user pages. Insert the access patterns (i.e., $E_0(O,L), \ldots, E_1(O,L)$) into the version-tree with root node ⟨CR3, S⟩. That is, store the access time, location L, and "diffs" of the changed blocks for write operations, into the version-tree for that process. Update the root node to be the tuple ⟨CR3, S∪S'⟩.

These version-trees are periodically written to disk and stored as an audit log where each record in the log is itself a version-tree. Whenever the system call module notes a causal relationship between entities accessing the same monitored objects e.g., $E_i(O,L)$ by entity $p_1$ and $E_j(O',L')$ by $p_2$—a pointer to $p_2$ may be added in the version tree of $p_1$. These pointers help with efficient processing of the audit log.

Log tampering may be detected using a hashchain mechanism implemented based on the cryptographic protocol described by Schneier and Kelsey [30]. The untrusted logging assumption may be relaxed and the use of a thirdparty trusted verifier used by Schneier and Kelsey [30] foregone, since logging is performed by a trusted entity in the framework—the hypervisor. The goal is to simply provide a mechanism that can detect any tampering with the log. To that end, the following principles from [30] may be leveraged:
1) The authentication keys are hashed using a one-way hash and regenerated for every insertion.
2) Encryption keys are generated by applying a one-way hash to the authentication keys.
3) Each log entry contains a hash-chain element that is required to verify all other previous entries.

The authentication tree $A_j$ and the encryption key $K_j$ derived by hashing $A_j$ may be utilized to insert the jth log entry (e.g., the version tree to be stored $V_j$). The logging module is initialized by the administrator providing a secret key $A_0$. Subsequent authentication keys $A_{j+1}$ are derived by hashing $A_j$. Each hash chain entry $H_j$ is then derived by hash($H_{j-1}, E_{K_j}(V_j)$), where $H_{-1}$ is initialized by a 4 byte block form /dev/random. As noted by Schneier and Kelsey [30] using the encrypted hash of the data allows verification without divulging the contents. Finally the log entry $L_j$ contains ($V_j, H_j$). Since every hash entry depends on the previous entries and the keys are regenerated on every insertion, an attacker cannot add or delete new entries without knowledge of all the prior authentication keys. Hence by simply scanning the hash chain entries one can easily detect any attempts to tamper with the log. For a detailed security analysis of this protocol, refer to Schneier and Kelsey [30]. Having recorded the accesses to objects in L, the logs can be mined to reconstruct detailed information to aide in forensic discovery.

To enable efficient processing of the data during forensic analysis, the current prototype supports several built-in operations. These operators form our base operations, but can be combined to further explore the audit log. For the exemplary analyses discussed in greater detail below, the following operations were sufficient to recover detailed information after a system compromise:
report(w,B): searches all the version trees and returns a list of IDs and corresponding accesses to any block b∈B during time window w.
report(w,ID): returns all blocks accessed by ID during time window w.
report(w,access,B|ID): returns all operations of type access on any block b∈B, or by ID, during time window w.
report(w,causal,B|ID): returns a sequence of events that are causally related based on either access to blocks b∈B, or by ID, during time window w.

Individual blocks by themselves do not provide much value unless they are grouped together based on a semantic view. The challenge of course is that since changes are monitored at the block layer, file-system level objects are not visible. Hence, the relationships between blocks must be recreated in lieu of file-level information. Fortunately, all hope is not lost as file-systems use various mechanisms to describe data layout on disk. This layout includes how files, directories, and other system objects are mapped to blocks on disk. In addition, these structures are kept at set locations on disk and have a predefined binary format. As one main deployment scenario is the enterprise model, like Payne et al. [20] it may be assumed that the file-system (e.g., ext3, ntfs, etc.) in use by the guest VM is known.

Armed with that knowledge, the storage module periodically scans the disk to find the modes and superblocks (or similarly, the Master File Table and Master File Records under NTFS) so that this meta-data can be used during forensic recovery. That is, for any set of blocks returned by a report( ) operator, the stored file-system metadata may be used to map a cluster of blocks to files. For ease of use, a facility may be provided that allows an analyst to provide a list of hashes of files and their corresponding filenames. The report( ) operators use that information (if available) to compare the hashes in the list to those of the recreated files, and tags them with the appropriate filename.

While the discussion thus far has presented the introspection mechanisms as a technique for merely tracking and logging data accesses, the extensible design of the platform makes it relatively straightforward to extend its capabilities to thwart inadvertent or intentional disclosures of sensitive information. The desire to not only monitor, but to also block attempts to transmit data originating from a restricted datastore is very natural in security-sensitive scenarios.

One threat to consider is not from a malicious virtual machine, but rather from users that may inadvertently leak sensitive information during their analyses of the private data. Sadly, such breaches of privacy occur all too often, as exemplified by the recent release of over 20,000 patient records from a Stanford Hospital. In that case, a spreadsheet with information including names, diagnosis codes, and billing charges, was attached to a question posted to a how-to forum, where the researcher was asking for assistance with data analytics. (See, for example, the NY Times article entitled "Patient Data Posted Online in Major Breach of Privacy", Sep. 8, 2011.)

To help minimize the risk of data exfiltration, a selective blocking mechanism may be introduced. Selective blocking limits data exfiltration over the network by blocking the packets containing protected data and then notifying users of potentially accidental data exfiltration; it does so in real-time as the user performs the operation triggering the data exfiltration. It is anticipated that the ability to selectively block connections containing sensitive data (i.e., in this case, data originating from a monitored store) would be of tremendous value to secure cloud computing environments for sensitive medical data. Indeed, the University of North Carolina has engaged in an effort to provide medical researchers at the North Carolina Translational and Clinical Science Institute access to medical records hosted in private clouds, and it is this need that motivated the development of the selective blocking capability described herein. (See UNC's Secure Cloud for Clinical Data at http://www.genomeweb.com.) performs the operation triggering the data exfiltration. It is anticipated that the ability to selectively block connections containing sensitive data (i.e., in this case, data originating from a monitored store) would be of tremendous value to secure cloud computing environments for sensitive medical data. Indeed, the University of North Carolina has engaged in an effort to provide medical researchers at the North Carolina Translational and Clinical Science Institute access to medical records hosted in private clouds, and it is this need that motivated the development of the selective blocking capability described herein. (See UNC's Secure Cloud for Clinical Data at http://www.genomeweb.com.)

Figure 5:
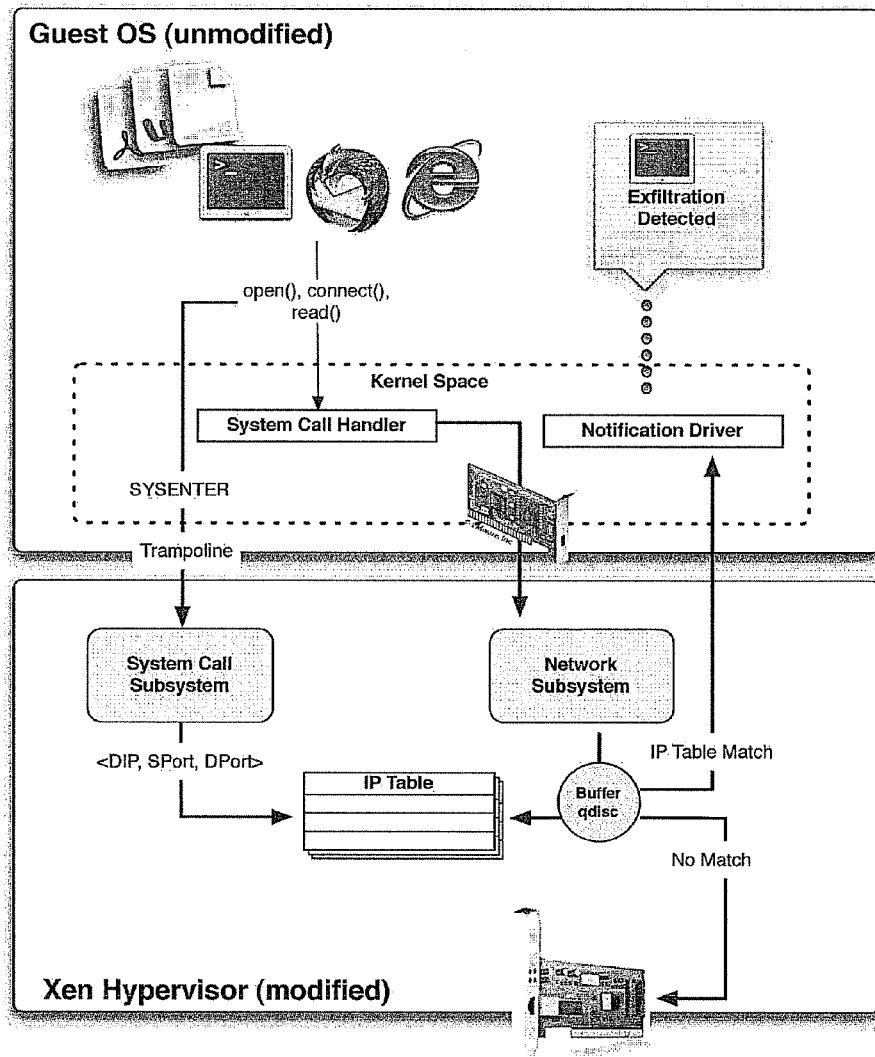
FIG. 5 illustrates an overview of a selective blocking mechanism for efficient computer forensic analysis and data access control in accordance with embodiments of the subject matter described herein.

FIG. 5 illustrates an overview of a selective blocking mechanism for efficient computer forensic analysis and data access control in accordance with embodiments of the subject matter described herein. Recall that the system call module traps specific system calls made by applications inside a virtual machine, parses the argument list and determines whether the call references a monitored memory location by consulting the watch list. This mechanism may be leveraged to identify potential exfiltration attempts by extracting the destination IP address, source, and destination ports from network specific system calls (e.g. connect( ), sendto( ) in Linux) if they reference a protected location in memory. The IP addresses and ports are then hashed and stored in an internal IP table within the hypervisor. This allows network packets to be tagged by simply looking at the packet IP headers.

To block the packets, a network module may be implemented that routes all packets from the virtual network interface of the VM to a custom queuing disc within the hypervisor. Linux supports implementation of custom network schedulers that can be registered for processing ingress and egress packets using what are known as queuing disciplines or qdiscs. The qdisc implemented may inspect all egress packets and filter packets based on the rules in the internal IP table. The filtered packets are then stored within a buffer (per connection) within the hypervisor, the audit log is queried to find the offending process's PID, and a notification is sent to the VM.

To interact with the user, an interrupt is injected into the virtual machine by the network monitoring module when data is buffered. Within the virtual machine, a Windows notification driver handles the interrupt from the network monitoring module. This driver presents the user with a popup notification message containing information about the file name of the protected data being leaked along with the name of the offending application.

The instant implementation of selective blocking incurs a fairly low overhead compared to data leak protection (DLP) systems that employ deep packet inspection (DPI) by performing fuzzy hashing on a packet's payload. Unlike such heavy weight and error-prone approaches, packets are buffered by simply peeking at the IP header of each packet. Furthermore, DPI based solutions would be incapable of blocking connections that contain encrypted payloads (e.g., HTTPS connections), but the instant implementation is not subject to this limitation as it works purely on the IP headers. An evaluation of this extension is described in greater detail below.

While having the ability to record fine-grained data accesses is a useful feature, any such system is impractical if the approach causes a high overhead. An analysis of the accuracy and overhead observed as part of an empirical evaluation of the subject matter described herein is provided below. Experiments were conducted on a 2.53 GHz Intel Core2 Dual Core machine with 2 GB of memory and Intel-VT hardware virtualization support enabled. A modified version of Xen 3.4 with HVM support served as the hypervisor, and the guest virtual machines were either Windows XP (SP2) or Debian Linux (kernel 2.6.26). The virtual machines were allocated with 512 MB memory, 1 virtual CPU, and with the hypervisor and virtual machine pinned to two different physical cores. This was done in order to reflect accurate measurements of CPU overheads. Five disks were mounted—a 20 GB system disk, two 20 GB data disks, a 10 GB USB disk, and a 10 GB network mapped disk. All disks contained both protected and extraneous files, and all experiments were run using dynamic provisioning mode, unless otherwise stated.

First, the overhead associated with the approach was calculated under a stress test using a Workload Generator and a workload modeled for Enterprise users. Specifically, the design was subjected to a series of tests (using IOMeter) to study resource utilization under heavy usage, and a scripting framework for Windows (called AutoIt) was used to automate concurrent use of a variety of applications. The application set chosen was Microsoft Office, plus several tools to create, delete, and modify files created by the Office applications. The parameters for the workload generator (e.g., the number of concurrent applications, average typing speed, frequency of micro-operations including spell-check in Word and cell calculations in Excel, etc.) were set based on empirical studies [31]. The Workload Generator tests were conducted on an empty NTFS partition on one of the data disks, while the Enterprise Workload was tested with pre-seeded data comprising a set of Microsoft Office files along with additional binaries. These binaries performed various memory mapped, network and shared memory operations. The binaries were added to increase the pool of applications loaded during the tests, and hence add greater diversity in the resulting code pages loaded into memory.

Figure 6B:
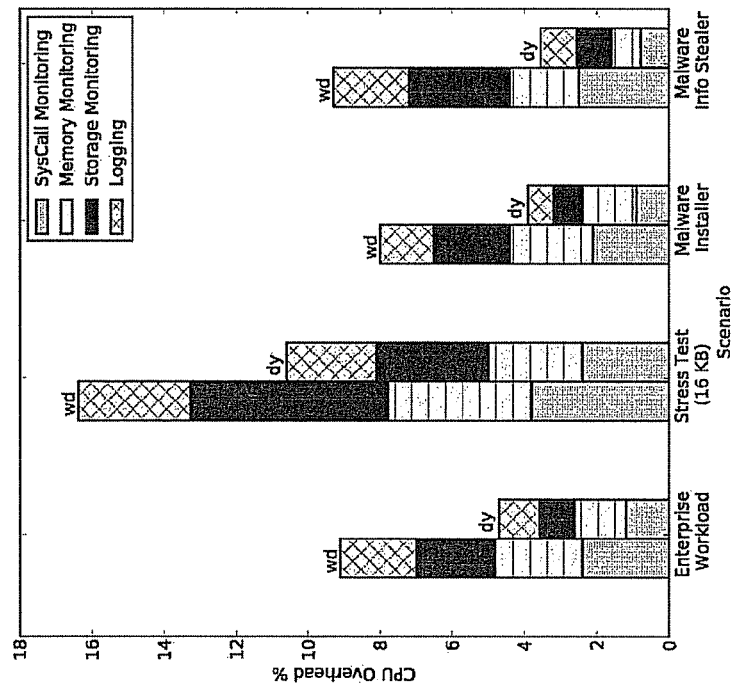
FIG. 6B is a chart illustrating a breakdown of CPU overhead across different test scenarios performed as part of an empirical evaluation of a system for efficient computer forensic analysis and data access control in accordance with embodiments of the subject matter described herein.
Figure 6A:
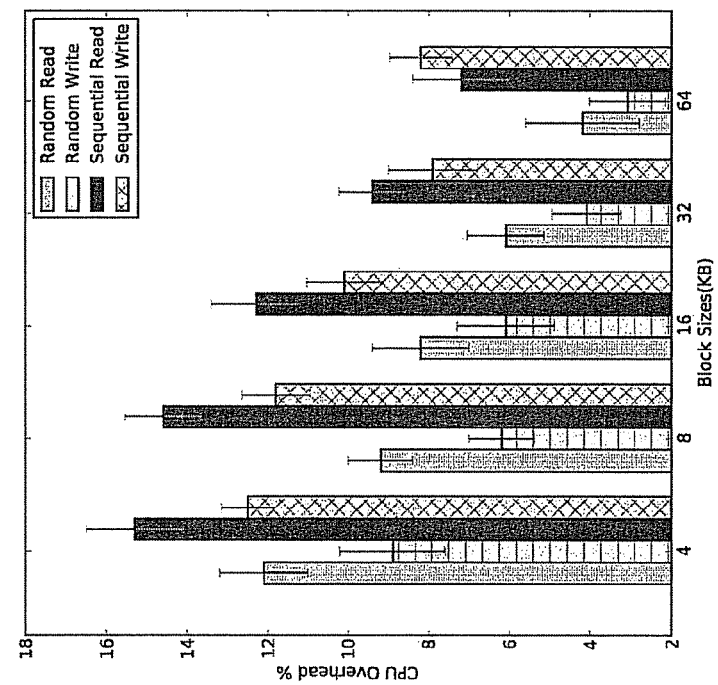
FIG. 6A is a chart illustrating runtime overhead recorded as part of an empirical evaluation of a system for efficient computer forensic analysis and data access control in accordance with embodiments of the subject matter described herein.

FIG. 6A is a chart illustrating runtime overhead recorded as part of an empirical evaluation of a system for efficient computer forensic analysis and data access control in accordance with embodiments of the subject matter described herein. The block sizes were chosen to reflect normal I/O request patterns, and for each block size, random read, random write, sequential read and sequential write access patterns were performed. The reported result is the average and variance of 10 runs. Each run was performed under a fresh boot of the guest VM to eliminate any disk cache effects. The IOMeter experiments were run on the same data disk with and without the monitoring code, and the overhead was calculated as the percent change in CPU utilization. The CPU utilization was monitored on both cores using performance counters. The reported utilization is the normalized sum of both cores.

Not surprisingly, writes have a lower overhead due to the increased time for completion from the underlying disk. Conversely, sequential access consumes more CPU as the disk subsystem responds faster in this case, and hence the I/O ring is quickly emptied by the hypervisor. Even under this stress test, the overhead is approximately 18%. This moderate overhead can be attributed to several factors in the design, including the scheduling of lazy writes of the data structures, the lightweight nature of the system-call monitoring, and the efficiency of the algorithms used to extract the code pages.

FIG. 6B is a chart illustrating a breakdown of CPU overhead across different test scenarios performed as part of an empirical evaluation of a system for efficient computer forensic analysis and data access control in accordance with embodiments of the subject matter described herein. The chart shows a breakdown of CPU overhead across different test scenarios when using either dynamic provisioning or whole disk monitoring modes. As expected, dynamic provisioning significantly out-performs whole disk monitoring in all test scenarios. Notice that the majority of the overhead for the 16 KB stress test scenario is attributed to the storage subsystem, as many of the accesses induced in this workload are for blocks that are only accessed once. It should be recalled, that the expected use case for the platform is under the Enterprise Workload model, and the overall overhead when using dynamic provisioning in this case is below 5%, with no single module incurring overhead above 1%. Also shown are the averaged overheads induced when monitoring and logging the activities of several real-world malware. In all cases, the overload is below 6%, which is arguably efficient enough for real-world deployment. A more detailed discussion of how the behavioral profiles of these malware were reconstructed using the forensic platform is described in greater detail below.

Another important dimension to consider is the growth of the log compared to the amount of actual data written by the guest VM. Recall that the audit log stores an initial copy of a block at the first time of access, and thenceforth only stores the changes to that block. Furthermore, at every snapshot, merging is performed and the data is stored on disk in an optimized binary format. The log file growth was examined by monitoring the audit log size at every purge of the version-trees to disk (10 mins in the instant implementation). In the case of the Enterprise Workload, the experiment lasted for 1 hour, with a minimum of 4 applications running at any point in time. During the experiment, control scripts cause the overall volume of files to increase at a rate of at least 10%. The file sizes of the new files were chosen from a zipf distribution, allowing for a mix of small and large files [32]. Operations such as make were also included to emulate creation and deletion of files. The overhead (i.e., additional disk space used to store logs and metadata compared to the monitored disk blocks) was on average≈2%. Since the Enterprise Workload is meant to reflect day-to-day usage patterns, the low overhead indicates that this platform is practical and deployable.

To examine the accuracy of the logging infrastructure, the ability to detect accesses to the monitored data store by "unauthorized" applications was explored. Again, the Enterprise Workload was used for these experiments, but with a varying concurrency parameter. Specifically, each run now includes a set of authorized applications and a varying percentage of other applications that also perform I/O operations on monitored blocks. The ratio of unauthorized applications for a given run was increased in steps of 5%, until all applications running were unauthorized. A set of files was also selected and their hashes provided to the selective blocking module to evaluate the effectiveness of the platform in preventing exfiltration of data. The task at hand was to reconstruct all illicit accesses to the disk. These illicit accesses include copying a file into memory, copying a file to the USB disk, sending a file over a network connection, and shared memory or IPC operations on monitored objects. To reconstruct the illicit accesses, the audit log was queried for the time-window spanning the entire duration of the experiment to identify both the unauthorized applications and the illicit access to blocks. A true positive rate of 95% was achieved for identification of the illicit applications and a 97% true positive rate was achieved in identifying the blocks accessed by these applications.

To evaluate the performance benefits of tracking targeted blocks over an entire disk, multiple disks were setup on a network "honeypot" and the movement of protected files tracked over these disks. The set of files placed for this experiment were chosen specifically to bait malware (e.g., W32.Tapin and W32.Pilleuz) that copy themselves over network and external drives and other infostealers. FIG. 7A is a chart illustrating blocks being tracked over two data disks over two days using whole disk monitoring mode as part of an empirical evaluation of a system for efficient computer forensic analysis and data access control in accordance with embodiments of the subject matter described herein. The chart shows blocks being tracked over the two data disks over two days, the darker shades indicate blocks that are tracked over multiple hours, whereas the lighter colored regions are blocks not being tracked. Under whole disk monitoring mode, as malware copies itself over to the secondary disk or attempts to copy files, all the blocks contained on the disk are automatically considered to be protected and hence tracked. This is evident from the chart where we see dark regions on both disks, even though the secondary disk only contains a few protected files. However, when dynamic provisioning is employed, only blocks corresponding to protected files are constantly monitored.

Figure 7B:
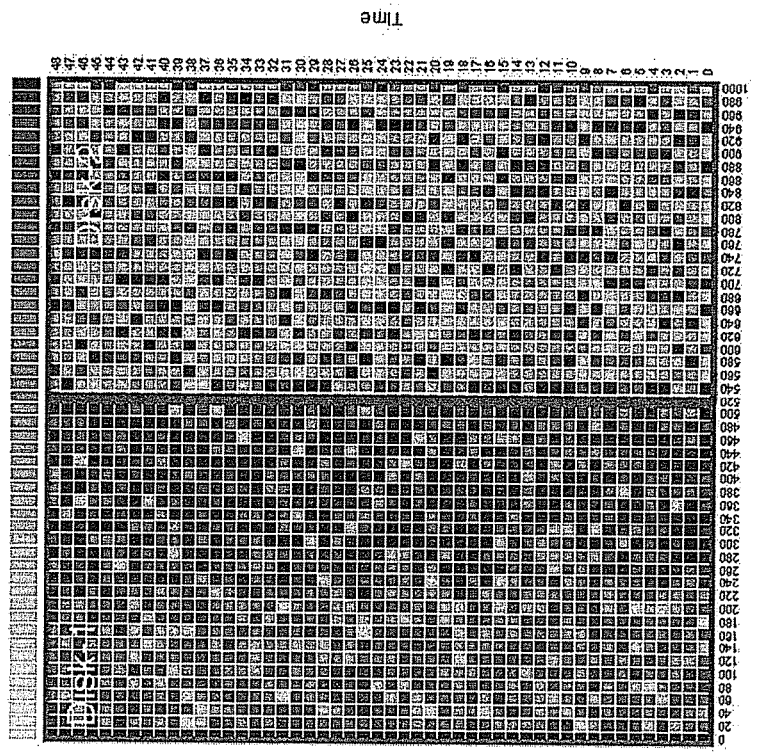
FIG. 7B is a chart illustrating blocks being tracked over two data disks over two days in which dynamic provision was employed as part of an empirical evaluation of a system for efficient computer forensic analysis and data access control in accordance with embodiments of the subject matter described herein.
Figure 7A:
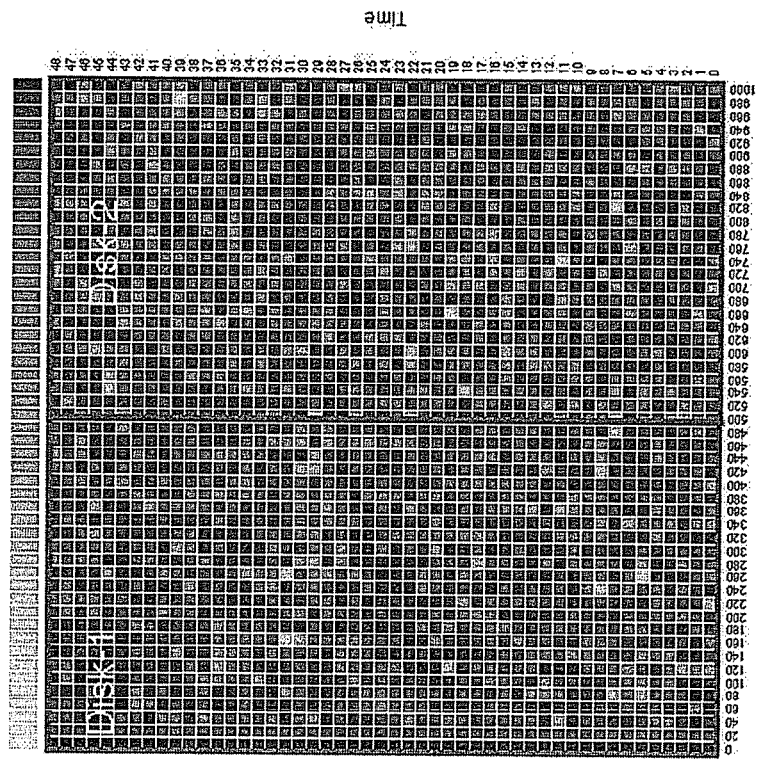
FIG. 7A is a chart illustrating blocks being tracked over two data disks over two days using whole disk monitoring mode as part of an empirical evaluation of a system for efficient computer forensic analysis and data access control in accordance with embodiments of the subject matter described herein.

FIG. 7B is a chart illustrating blocks being tracked over two data disks over two days in which dynamic provision was employed as part of an empirical evaluation of a system for efficient computer forensic analysis and data access control in accordance with embodiments of the subject matter described herein. The chart illustrates this with the presence of only a few dark (tracked) regions on the right side of the heatmap. Since only specific disk regions were tracked, a major improvement in CPU performance is seen as the number of VMEXITs decrease significantly under dynamic provisioning mode.

Selective Blocking requires a fast insertion of the network 5-tuple into the internal IP table in order to effectively block exfiltration attempts. To test the performance of the module under varying network load, a simple file transfer utility was written that creates a specified number of network connections and attempts to transfer protected files to an external machine. Iperf [33] was used to generate background traffic during the experiments.

Table 1 shows the breakdown of the average time taken to insert a 5-tuple into the maintained internal IP table. During the experiment the number of unique connections is gradually increased so that the utility generates from 10 to 10,000. As noted earlier, every insertion requires parsing of the arguments for specific systems calls and then extracting the 5-tuple. The information is then passed to the selective blocking module via a VMEXIT. As can be seen from the table, VMEXIT times are less than 4 microseconds, even in the worst case. The insertion into the internal IP table involves acquiring locks, hence the spike in insertion time as the number of connections is increased. Since selective blocking mode prevents file transfers, the client application should ideally receive no packets. This is reflected by the blocking accuracy, where all packets are blocked except for a few in the 10,000 connection test. In this case, a few TCP SYNs were not blocked due to queuing of insertion operations at the network module. It should be noted, however, that 10,000 unique connections/minute is extremely high.

TABLE 1

| Connections/min | VMEXITS (µs) | Insertion (µs) | Blocked (%) |
| --- | --- | --- | --- |
| 10 | 1.2 | 0.5 | 100 |
| 100 | 1.8 | 1.1 | 100 |
| 1,000 | 2.5 | 2.0 | 100 |
| 10,000 | 3.8 | 6.5 | 98.9 |

To further showcase the benefits of the platform, the following account described an experience with deploying the framework in an open access environment that arguably reflects the common case of corporate laptops being used in public WiFi environments. Specifically, the approach deployed a laptop supporting hardware virtualization, on top of which a Windows XP guest was run with unfettered access to the network. The enterprise workload was configured to run on the guest system to simulate a corporate user. Similar to the earlier experiment, 5 disks were attached to the machine—a system disk, two data disks, a network share and a USB disk. All the drives were seeded with files similar to those described above and a subset of these files were chosen to provide to the selective blocking module. While there was no host or network-level intrusion prevention system in place on the guest system, Snort was also deployed and captured network traffic on a separate machine. This allowed for the subsequent confirmation of findings derived from the audit mechanism. The laptop was left connected to the network for one week, and its outbound traffic was rate-limited in an attempt to minimize the risk of infecting other network citizens.

To automate the forensic recovery process, a proof-of-concept tool that mines the audit logs looking for suspicious activity was used. Similar to Patagonix [19], the existence of a trusted external database, D, (e.g., [34]) that contains cryptographic hashes of applications the system administrator trusts was assumed. The code pages for these authorized applications were created using a userland application that runs inside a pristine VM and executes an automated script to launch applications. The userland application communicates with the memory monitoring module, and tags the pages collected for the current application. The pages are extracted as described above, and are stored along with the application tags. Notice that these mappings only need be created once by the system administrator.

The log was then mined for each day using report(24 hr,B) to build a set of identifiers (p∈P), where B={blocks for the temp, system, and system 32 directories and the master boot record}. All causally related activity for each p∉D was then extracted by issuing report(24 hr, causal,p). The result is the stored blocks that relate to this activity. These blocks are automatically reassembled by mapping blocks to files using the file system metadata saved by the storage module. At this point a set of unsanctioned applications and what blocks they touched on disk is known. Each returned event sequence was then classified as either (i) an info stealer: that is, a process that copied monitored objects onto an external location (e.g., L=network) or (ii) an installer: a process that installs blocks belonging to an info stealer.

To do so, the recovery utility first iterates through the set of unsanctioned applications and checks the corresponding version-trees for events that match an info stealer's signature. For each match, all its blocks are extracted, and a report(24 hr, $b_i$, . . . , $b_n$) issued. This yields the list of all unsanctioned applications that touched an info stealer's blocks. From this list, the one that initially wrote the blocks onto disk may be searched for by issuing report(24 hr, write, $b_i$, . . . , $b_n$). The result is an installer.

Table 2 shows the result of running the proof-of-concept forensic tool on the audit logs collected from the laptop. The table shows the percentage of activity for each malicious binary and the classification as per the tool. For independent analysis, the reconstructed files were uploaded to Microsoft's Malware Center; indeed all the samples were returned as positive confirmation as malware. The entire disk was also subjected to a suite of AV software, and no binaries were flagged beyond those that were already detected by the tool.

TABLE 2

| Malware | Activity in Log (%) | Disk Search | Exfiltration | Classification |
| --- | --- | --- | --- | --- |
| Zeus & Variants | 30.0 | active | active | info stealer |
| Ldpinch | 20.5 | active | active | info stealer |
| Alureon | 15.0 | active | active | info stealer |
| Koobface | 10.0 | passive | active | installer |
| Bubnix | 5.0 | passive | active | installer |
| Masavebe | 5.0 | passive | active | both |
| Sinowal | 3.5 | active | active | both |
| Pilleuz | 4.5 | active | active | both |
| Tapin | 3.0 | passive | passive | installer |
| Mebromi | 2.5 | passive | passive | installer |
| Kenzero | 1.5 | active | active | info stealer |

To get a better sense of what a recovered binary did, its behavior was classified as active if it had activity in the audit logs every day after it was first installed; or passive otherwise. The label "Exfiltration" means that data was attempted to be shipped off the disk. "Disk search" means that the malware scanned for files on the monitored store. As the table shows, approximately 75% of the recorded activity can be attributed to the info stealers. Upon closer examination of the blocks that were accessed by these binaries, it was possible to classify the files as Internet Explorer password caches and Microsoft Protected Storage files. An interesting case worth pointing out here is Zeus. The causal event linkage by the forensic tool allowed tracking of the initialization of Zeus as Zbot by Sinowal. Even though Sinowal constitutes only 4% of activity in the logs, it was responsible for downloading 60% of the malware on the system. Zeus appears to be a variant that used Amazon's EC-2 machines as control centers. (This hypothesis was independently verified based on network logs.) Finally even though malware such as Kenzero; Tapin; Pilleuz were found to have low activity in the logs, they nevertheless had interesting behavior worth noting. Pilleuz; Tapin scanned the system for the presence of network and removable drives and would copy themselves over to those drives as a possible way to increase the spread of the worms. Pilleuz would also scan removable drives (e.g., our mounted USB drive), and scan for possible files to exfiltrate. Mebormi is a fairly recent malware that attempts to infect the Master Boot Record (MBR), similar to Mebroot, a detailed analysis of which is discussed below. Interestingly, the average growth of the audit log was only 9 MB per day compared to over 400 MB per day from the combined Snort and network data recorded during the experiment. Yet, as will be described in greater detail below, the data captured is detailed enough to allow one to perform interesting behavioral analyses. The analysis in Table 2 took less than 4 hours in total to generate the report, and the proof-of concept prototype can be significantly optimized. Finally the selective blocking mode blocked all of the exfiltration attempts, as confirmed by the absence of alerts in the Snort logs.

Figure 8:
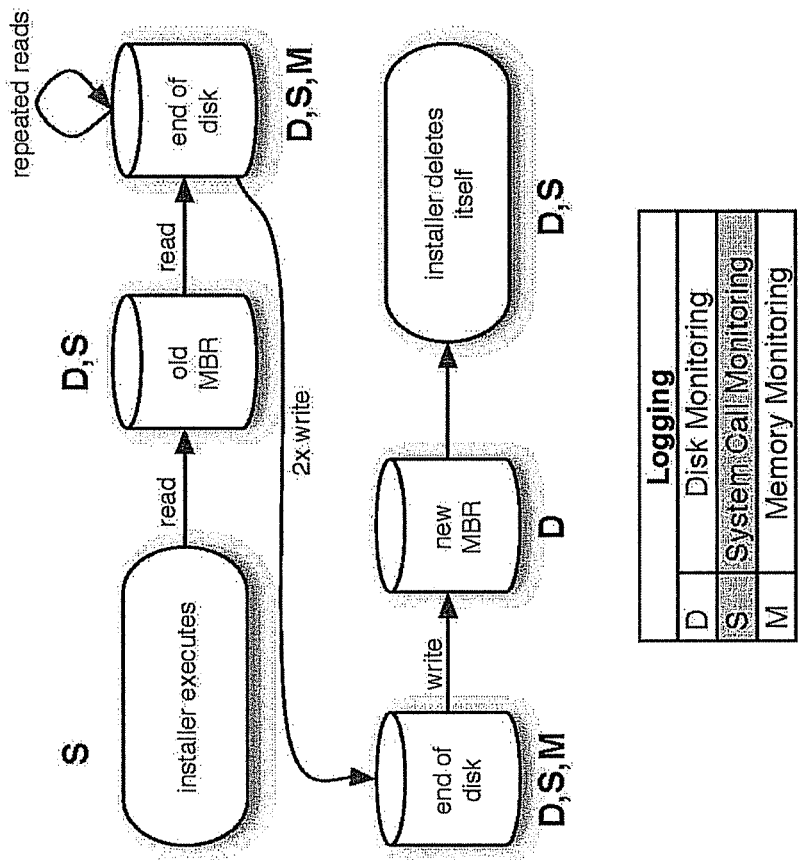
FIG. 8 is an annotated graph illustrating the causal reconstruction of an example attack vector as recovered from processing audit logs generated by a system for efficient computer forensic analysis and data access control in accordance with embodiments of the subject matter described herein.

The flexibility of the framework in helping with behavioral analysis was also explored. Specifically, the framework was utilized in analyzing Mebroot, which is a part of the stealthy Sinowal family. FIG. 8 is an annotated graph illustrating the causal reconstruction of an example attack vector as recovered from processing audit logs generated by a system for efficient computer forensic analysis and data access control in accordance with embodiments of the subject matter described herein.

Mebroot serves as a good example as reports by F-Secure [35] labels it as one of the "stealthiest" malware they have encountered because it eschews traditional windows system call hooking, thereby making its execution very hard to detect. The anatomy of the Mebroot attack can be summarized as follows: first, a binary is downloaded and executed. Next, the payload (i.e., from the binary) is installed, and the master boot record (MBR) is modified. Lastly, the installer deletes itself.

To understand what Mebroot did, a report(∞,causal,ID (Mebroot)) was issued. The reason why the causal relationship between the first two steps is built by our monitoring infrastructure should be obvious. In the platform, the connection between the first and last steps is made when the file deletion is noted (i.e., when the storage module rescans the modes). Referring to FIG. 8, notice that because "diffs" are stored in the version trees, all the modifications made to the master boot record are also visible.

To further evaluate the strength of the platform in helping an analyst quickly reconstruct what happened after a compromise is detected, two malware samples were provided to a seasoned malware analyst for inspection. In both cases, the malware was successfully unpacked and disassembled using commercial software and inspected using dynamic analysis techniques for system-call sequence analysis, for finding the payload in memory, and for single-stepping its execution. The platform's results were then compared to those from this labor-intensive exercise.

The breakdown in terms of diagnosed functionality is shown in Table 3. The overall results were strikingly similar, though the analyst was able to discover several hooks coded in Phalanx2 (a sophisticated info stealer) for hiding itself, the presence of a backdoor, and different modes for injection that are not observable by the platform. From a functional point of view, the results for Mebroot were equivalent. More important, however, is the fact that the manual inspection verified the behavioral profile reported, attesting to the accuracy of the linkages automatically inferred.

TABLE 3

| Syscall (%) | Phalanx2 | | Mebroot | |
| --- | --- | --- | --- | --- |
| | Manual | Forensic | Manual | Forensic |
| Storage | 72% | 68% | 91% | 95% |
| Memory | 26% | 30% | 8% | 5% |
| Other | 2% | 2% | 1% | 0% |

As stated above, the approach taken relies on the security properties of the hypervisor to properly isolate the monitoring code from tampering by malicious entities residing in the guest OSes. This assumption is not unique to this solution, and to date, there has been no concrete demonstration that suggests otherwise. If the security of the hypervisor is undermined, however, so too is the integrity and correctness of the transactions recorded. Likewise, the approach suffers from the same limitations that all other approaches that have extended Xen (e.g., [16, 17, 20, 25]) suffer from—namely, that it extends the trusted code base.

A known weakness of current hypervisor designs is their vulnerability to hypervisor-detection attacks [36-38]. One way to address these attacks might be to rely on a thin hypervisor layer built specifically for data forensics, instead of using a hypervisor like Xen which provides such a rich set of functionality (which inevitably lends itself to being easily detected). Once the presence of a hypervisor has been detected, the attacker can, for instance, change the guest VM's state in a way that would cause the forensic platform to capture a morphed view of the VM [38]. An example of such an attack would involve the attacker attempting to circumvent the event model by modifying the System Call Tables in Linux or the SSDT in Windows to remap system calls. This could cause false events at the system call layer and pollute the audit logs. That said, such an attack poses a challenge for all the hypervisor-based monitoring platforms. Techniques to mitigate such attacks remain an open problem.

Resource exhaustion attacks offer another avenue for hindering the ability to track causal chains. As the infrastructure tracks all monitored objects in memory, an attacker could attempt to access hundreds of files within a short period of time, causing the memory monitoring module to allocate space for each object in its watchlist. If done using multiple processes, the attack would likely lead to memory exhaustion, in which case some monitored objects would need to be evicted from the watchlist. While several optimizations have been built to mitigate such threats (e.g., by collapsing contiguous pages to be tracked as a single address range), this attack strategy remains viable. Lastly, since interactions that directly manipulate the receive and transmit rings of virtual network interfaces are not monitored, such accesses will not be logged.

Figure 9:
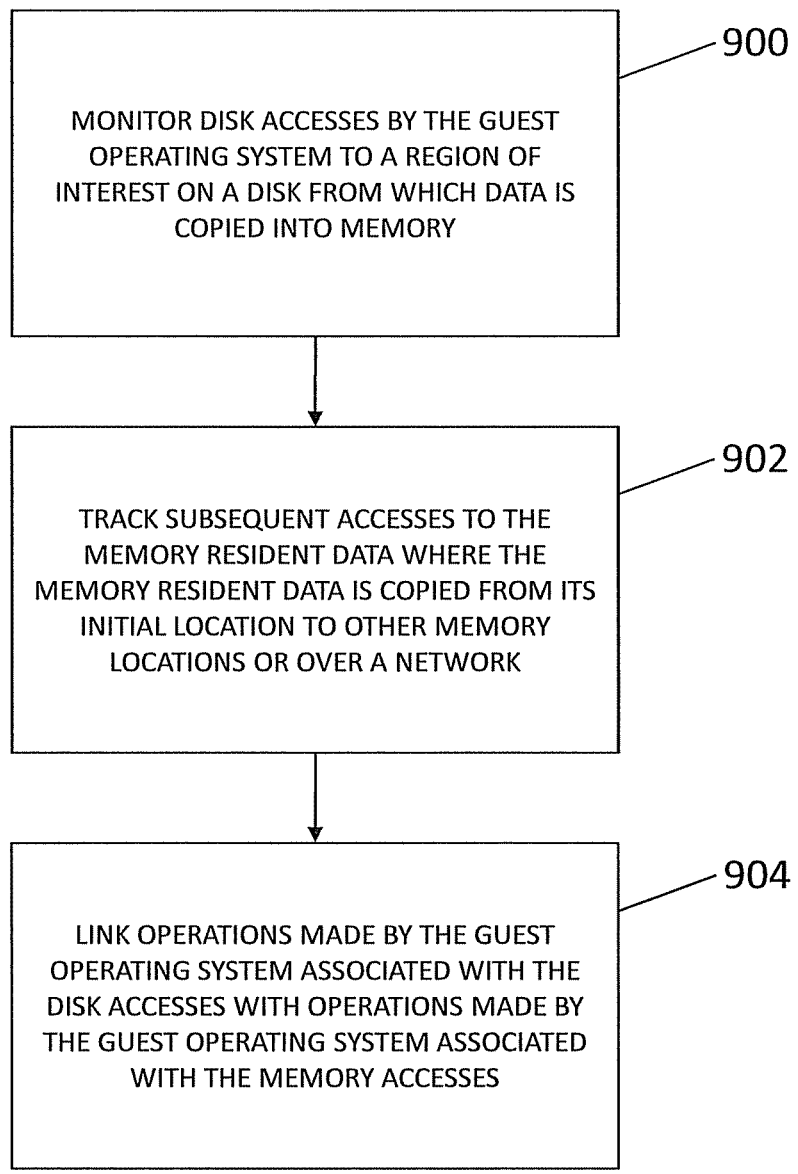
FIG. 9 is a flow chart illustrating an exemplary process for efficient computer forensic analysis and data access control in accordance with embodiments of the subject matter described herein.

FIG. 9 is a flow chart illustrating an exemplary process for efficient computer forensic analysis and data access control in accordance with embodiments of the subject matter described herein. Referring to FIG. 9, the steps illustrated may be performed from within a virtualization layer separate from a guest operating system. In step 900, disk accesses by the guest operating system to a region of interest on a disk from which data is copied into memory are monitored. In step 902, subsequent accesses to the memory resident data where the memory resident data is copied from its initial location to other memory locations or over a network are tracked. In step 904, operations made by the guest operating system associated with the disk accesses are linked with operations made by the guest operating system associated with the memory accesses.

Figure 10:
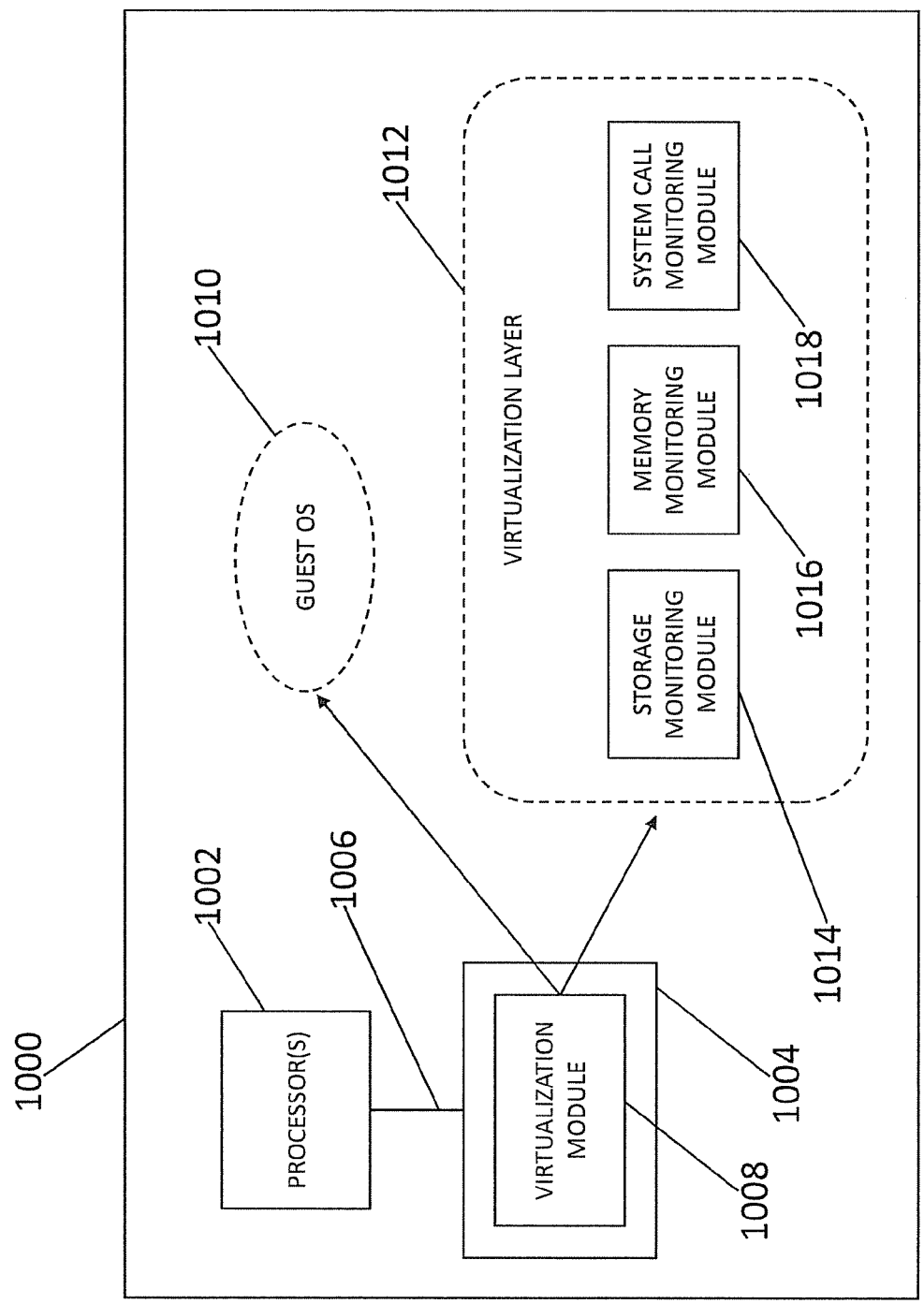
FIG. 10 is a block diagram illustrating an exemplary system for efficient computer forensic analysis and data access control in accordance with embodiments of the subject matter described herein.

FIG. 10 is a block diagram illustrating an exemplary system for efficient computer forensic analysis and data access control in accordance with embodiments of the subject matter described herein. Referring to FIG. 10, computing platform 1000 may include one or more processors 1002 and memory 1004. Processors 1002 and memory 1004 may be operative to communicate via bus 1006. Virtualization module 1008 may be embodied in memory 1004 and configured to create, support, and/or host guest OS environment 1010. Virtualization module 1004 may also be configured to create and utilize virtualization layer 1012, separate from guest OS environment 1010, for supporting, managing, and/or hosting guest OS environment 1010. For example, virtualization layer 1012 may be utilized to virtualize physical resources of computing platform 1000 for use by guest OS environment 1010. In accordance with embodiments of the subject matter described herein, virtualization layer 1012 may include storage monitoring module 1014, memory monitoring module 1016, and system call monitoring module 1018. Storage monitoring module 1014 may be configured to monitor disk accesses by guest OS environment 1010 to a region of interest on a disk from which data is copied into memory. Memory monitoring module 1016 may be configured to track subsequent accesses to the memory resident data where the memory resident data is copied from its initial location to other memory locations or over a network. System call monitoring module 1018 may be configured to link operations made by the guest operating system associated with the disk accesses with operations made by the guest operating system associated with the memory accesses.

An architecture for efficiently and transparently recording the accesses to monitored objects has been presented. The techniques take advantage of characteristics of platforms supporting hardware virtualization, and show how lightweight mechanisms can be built to monitor the causal data flow of objects in a virtual machine—using only the abstractions exposed by the hypervisor. The heuristics developed allow the monitoring framework to coalesce the events collected at various layers of abstraction, and to map these events back to the offending processes. This mechanism has been extended to provide the ability to block network events that attempt to exfiltrate data over a network connection. The mappings inferred are recorded in an audit trail, and several mechanisms that help with data forensics efforts have been provided; for example, allowing an analyst to quickly reconstruct detailed information about what happened when such information is needed the most (e.g., after a system compromise). To demonstrate the practical utility of the framework, how the approach can be used to glean insightful information on behavioral profiles of malware activity after a security breach has been detected has been discussed.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

REFERENCES

The references listed below, as well as all references cited in the specification, including patents, patent applications, journal articles, and all database entries, are incorporated herein by reference to the extent that they supplement, explain, provide a background for, or teach methodology, techniques, and/or compositions employed herein.

[1] N. Provos, D. McNamee, P. Mavrommatis, K. Wang, and N. Modadugu, "The Ghost in the Browser: Analysis of Web-based Malware," in First Workshop on Hot Topics in Understanding Botnets, 2006.

[2] J. Franklin, A. Perrig, V. Paxson, and S. Savage, "An Inquiry into the Nature and Causes of the Wealth of Internet Miscreants," in 14th ACM conference on Computer and communications security, 2007, pp. 375-388.

[3] D. Farmer and W. Venema, Forensic Discovery. Addison-Wesley, 2006.

[4] R. Goldberg, "Survey of Virtual Machine Research," IEEE Computer Magazine, vol. 7, no. 6, pp. 34-35, 1974.

[5] P. Chen and B. Noble, "When Virtual is Better than Real," in Workshop on Hot Topics in Operating Systems, May. 2001, pp. 133-138.

[6] Sean Peiset and Matt Bishop and Keith Marzullo, "Computer Forensics in Forensis," ACM Operating System Review, vol. 42, 2008.

[7] G. H. Kim and E. H. Spafford, "The Design and Implementation of Tripwire: a File System Integrity Checker," in 2nd ACM Conference on Computer and Communications Security, 1994, pp. 18-29.

[8] D. Vincenzetti and M. Cotrozzi, "ATP—Anti Tampering Program," in USENIX Security, 1993, pp. 79-90.

[9] A. Goel, K. Po, K. Farhadi, Z. Li, and E. de Lara, "The Taser Intrusion Detection System," in Symposium on Operating Systems Principles, October 2005.

[10] S. Jain, F. Shafique, V. Djeric, and A. Goel, "Application-Level Isolation and Recovery with Solitude," in EuroSys, April 2008, pp. 95-107.

[11] K. Muniswamy-Reddy, D. Holland, U. Braun, and M. Seltzer, "Provenance-aware Storage Systems," in USENIX Annual Technical Conference, 2006, pp. 43-56.

[12] K-K. Muniswamy-Reddy, P. Macko, and M. Seltzer, "Provenance for the Cloud," in USENIX Conference on File and Storage Technologies (FAST). Berkeley, Calif., USA: USENIX Association, 2010.

[13] T. Garfinkel, B. Pfaff, J. Chow, M. Rosenblum, and D. Boneh, "Terra: A Virtual Machine-Based Platform for Trusted Computing," in ACM Symposium on Operating System Principles, 2003, pp. 193-206.

[14] S. T. Jones, A. C. Arpaci-Dusseau, and R. H. Arpaci-Dusseau, "Antfarm: Tracking Processes in a Virtual Machine Environment," in USENIX Annual Technical Conference, 2006.

[15] S. Jones, A. Arpaci-Dusseau, and R. Arpaci-Dusseau, "Geiger: monitoring the buffer cache in a virtual machine environment," 12th International conference on Architectural Support for Programming Languages and Operating Systems (ASPLOS), vol. 41, no. 11, pp. 14-24, 2006.

[16] X. Jiang, X. Wang, and D. Xu, "Stealthy Malware Detection through VMM-based "out-of-the-box" Semantic View Reconstruction," in 14th ACM conference on Computer and Communications Security, 2007, pp. 128-138.

[17] S. King and P. Chen, "Backtracking Intrusions," 19th ACM Symposium on Operating Systems Principles, December 2003.

[18] S. T. King, Z. M. Mao, D. G. Lucchetti, and P. M. Chen, "Enriching intrusion alerts through multi-host causality," in Network and Distributed System Security Symposium, 2005.

[19] L. Lilly, H. Lagar-Cavilla, and D. Lie, "Hypervisor Support for Identifying Covertly Executing Binaries," in USENIX Security Symposium, August 2008, pp. 243-257.

[20] B. D. Payne, M. Carbone, and W. Lee, "Secure and flexible monitoring of virtual machines," Annual Computer Security Applications Conference, pp. 385-397, 2007.

[21] S. Krishnan, K. Z. Snow, and F. Monrose, "Trail of bytes: Efficient Support for Forensic Analysis," in 17th ACM conference on Computer and Communications Security, October 2010.

[22] F. Buchholz and E. Spafford, "On the Role of File System Metadata in Digital Forensics," Digital Investigation, vol. 1, no. 4, pp. 298-309, 2004.

[23] P. Barham, B. Dragovic, K. Fraser, S. Hand, T. Harris, A. Ho, R. Neugebauer, I. Pratt, and A. Warfield, "Xen and the Art of Virtualization," in 19th ACM Symposium on Operating Systems Principles, 2003, pp. 164-177.

[24] F. Leung, G. Neiger, D. Rodgers, A. Santoni, and R. Uhlig, "Intel Virtualization Technology: Hardware Support for Efficient Processor Virtualization," Intel Technology Journal, vol. 10, 2006.

[25] A. Dinaburg, P. Royal, M. Sharif, and W. Lee, "Ether: Malware Analysis via Hardware Virtualization Extensions," in 15th ACM Conference on Computer and Communications Security, 2008, pp. 51-62.

[26] D. E. Denning and P. J. Denning, "Certification of Programs for Secure Information Flow," Communications of the ACM, vol. 20, no. 7, pp. 504-513, 1977.

[27] S. Chen, J. Xu, N. Nakka, Z. Kalbarczyk, and R. K. Iyer, "Defeating Memory Corruption Attacks via Pointer Taintedness Detection," in IEEE International Conference on Dependable Systems and Networks (DSN, 2005, pp. 378-387.

[28] A. Slowinska and H. Bos, "Pointless Tainting? Evaluating the Practicality of Pointer Tainting," in EuroSys, April 2009.

[29] S. Quinlan and S. Dorward, "Venti: A New Approach to Archival Data Storage," in USENIX Conference on File and Storage Technologies, 2002, pp. 89-101.

[30] B. Schneier and J. Kelsey, "Secure Audit Logs to Support Computer Forensics," ACM Transactions of Information and System Security, vol. 1, no. 3, 1999.

[31] C. Jay, M. Glencross, and R. Hubbold, "Modeling the Effects of Delayed Haptic and Visual Feedback in a Collaborative Virtual Environment," ACM Transactions on Computer-Human Interaction, vol. 14, no. 2, p. 8, 2007.

[32] A. W. Leung, S. Pasupathy, G. Goodson, and E. L. Miller, "Measurement and Analysis of Large-scale Network File System Workloads," in USENIX Annual Technical Conference, 2008, pp. 213-226.

[33] A. Tirumala, F. Qin, J. Dugan, J. Ferguson, and K. Gibbs, "Iperf: The tcp/udp bandwidth measurement tool," URL: http://dast. nlanr. net/Projects/Iperf, 2004.

[34] NIST, "National Software Reference Library," 2009.

[35] F-Secure, "MBR Rootkit, A New Breed of Malware," See http://www.f-secure.com/weblog/archives/00001393.html, 2008.

[36] T. Garfinkel, K. Adams, A. Warfield, and J. Franklin, "Compatibility is not Transparency: VMM Detection Myths and Realities," in 11th USENIX workshop on Hot topics in operating systems, 2007, pp. 1-6.

[37] X. Chen, J. Andersen, Z. Mao, M. Bailey, and J. Nazario, "Towards an Understanding of Anti-virtualization and Anti-debugging Behavior in Modern Malware," in Dependable Systems and Networks, June 2008, pp. 177-186.

[38] T. Garfinkel and M. Rosenblum, "A Virtual Machine Introspection Based Architecture for Intrusion Detection," in Network and Distributed Systems Security Symposium, 2003, pp. 191-206.

What is claimed is:

1. A method for efficient computer forensic analysis and data access control, the method comprising:
    from within a virtualization layer of a first computing system separate from a guest operating system executing on the first computing system:
        monitoring disk accesses by the guest operating system to a region of interest on a disk from which data is copied into memory;
        tracking subsequent accesses to memory resident data where the memory resident data is copied from its initial location to other memory locations or over a network;
        linking operations made by the guest operating system associated with the disk accesses with operations made by the guest operating system associated with the memory accesses, wherein the operations made by the guest operating system associated with the disk accesses include a file read operation and wherein linking the operations made by the guest operating system associated with the disk accesses with the operations associated with the memory accesses includes examining source and destination parameters associated with the file read operation to infer that the operations concern the same data; and
        selectively blocking accesses by the guest operating system to memory or disk locations containing data of interest.

2. The method of claim 1 wherein the virtualization layer comprises a hypervisor layer.

3. The method of claim 1 wherein monitoring disk accesses includes maintaining a watch list of virtual machine disk blocks containing data of interest and determining whether a disk access corresponds to any of the virtual machine blocks on the watch list.

4. The method of claim 3 wherein tracking subsequent accesses to the memory resident data includes, in response to determining that the disk access corresponds to a virtual machine disk block on the watch list, triggering a memory monitoring module located within the virtualization layer to monitor a physical page of memory into which blocks of data from the disk access are paged.

5. The method of claim 1 comprising maintaining a watch list of file system objects corresponding to data of interest and determining whether a file system object operation corresponds to any of the file system objects on the watch list.

6. The method of claim 1 wherein tracking subsequent accesses to the memory resident data includes, in response to the memory resident data being copied from its initial location to another memory resident location, adding the new memory resident location to a watch list and monitoring subsequent accesses to the new memory resident location using the watch list.

7. The method of claim 1 comprising identifying a codepage signature of a process making the memory accesses and comparing the codepage signature to stored codepage signatures to identify the process.

8. The method of claim 7 comprising creating the codepage signature for the process by recognizing shared and kernel code pages associated with the process and utilizing the codepage signature to selectively extract codepages that identify the process.

9. The method of claim 1 comprising selectively blocking or dropping packets associated with a network connection without examining the packets' contents.

10. A system for efficient computer forensic analysis and data access control, the system comprising:
 a virtualization layer of a first computing system separate from a guest operating system executing on the first computing system for virtualizing resources of the first computing system;
 a storage monitoring module located within the virtualization layer and for monitoring disk accesses by the guest operating system to a region of interest on a disk from which data is copied into memory;
 a memory monitoring module located within the virtualization layer for tracking subsequent accesses to memory resident data where the memory resident data is copied from its initial location to other memory locations or over a network;
 a system call monitoring module for linking operations made by the guest operating system associated with the disk accesses with operations made by the guest operating system associated with the memory accesses, wherein the operations made by the quest operating system associated with the disk accesses include a file read operation and wherein linking the operations made by the guest operating system associated with the disk accesses with the operations associated with the memory accesses includes examining source and destination parameters associated with the file read operation to infer that the operations concern the same data; and
 an enforcement module for selectively blocking accesses by the guest operating system to memory or disk locations containing data of interest, wherein each of the storage monitoring module, the memory monitoring module, the system call monitoring module, and the enforcement module is implemented using at least one hardware processor.

11. The system of claim 10 wherein the virtualization layer comprises a hypervisor layer.

12. The system of claim 10 wherein the storage monitoring module is configured to maintain a watch list of virtual machine disk blocks containing data of interest and determine whether a disk access corresponds to any of the virtual machine blocks on the watch list.

13. The system of claim 12 wherein the storage monitoring module is configured to, in response to determining that the disk access corresponds to a virtual machine disk block on the watch list, trigger the memory monitoring module to monitor a physical page of memory into which blocks of data from the disk access are paged.

14. The system of claim 10 wherein the storage monitoring module is configured to maintain a watch list of file system objects corresponding to data of interest and determine whether a file system object operation corresponds to any of the file system objects on the watch list.

15. The system of claim 10 wherein the memory monitoring module is configured to, in response to the memory resident data being copied from its initial location to another memory resident location, add the new memory resident location to a watch list and monitor subsequent accesses to the new memory resident location using the watch list.

16. The system of claim 10 wherein the memory monitoring module is configured to identify a codepage signature of a process making the memory accesses and to compare the codepage signature to stored codepage signatures to identify the process.

17. The system of claim 16 wherein the memory monitoring module is configured to create the codepage signature for the process by recognizing shared and kernel code pages associated with the process and utilize the codepage signature to selectively extract codepages that identify the process.

18. The system of claim 10 comprising a network monitoring module configured to, in response to a trigger from either the memory monitoring module or the system call monitoring module, selectively block or drop packets associated with a network connection.

19. A non-transitory computer readable medium having stored thereon executable instructions that when executed by a processor of a computer control the computer to perform steps comprising:
 from within a virtualization layer of a first computing system separate from a guest operating system executing on the first computing system:
  monitoring disk accesses by the guest operating system to a region of interest on a disk from which data is copied into memory;
  tracking subsequent accesses to the memory resident data where the memory resident data is copied from its initial location to other memory locations or over a network;
  linking operations made by the guest operating system associated with the disk accesses with operations made by the guest operating system associated with the memory accesses, wherein the operations made by the quest operating system associated with the disk accesses include a file read operation and wherein linking the operations made by the quest operating system associated with the disk accesses with the operations associated with the memory accesses includes examining source and destination parameters associated with the file read operation to infer that the operations concern the same data; and
  selectively blocking accesses by the guest operating system to memory or disk locations containing data of interest.

* * * * *